United States Patent [19]
Kim

[11] Patent Number: 6,049,614
[45] Date of Patent: Apr. 11, 2000

[54] SYNCHRONIZED CHAOTIC SYSTEM AND COMMUNICATION SYSTEM USING SYNCHRONIZED CHAOTIC SYSTEM

[75] Inventor: Chil Min Kim, 2-509, Sindonga Apt., Ohjung-Dong Daejeon, Rep. of Korea

[73] Assignees: Daewoo Heavy Industries Ltd., Incheon; Chil Min Kim, Daejon, both of Rep. of Korea

[21] Appl. No.: 09/000,927

[22] Filed: Dec. 30, 1997

[30] Foreign Application Priority Data

Dec. 30, 1996 [KR] Rep. of Korea ...................... 96-76871

[51] Int. Cl.$^7$ ...................................................... H04L 9/00
[52] U.S. Cl. ................................ 380/48; 380/46; 380/28; 375/354
[58] Field of Search .................................. 380/28, 46, 48; 708/251, 255; 713/400; 375/356, 359, 354

[56] References Cited

U.S. PATENT DOCUMENTS

| | | | |
|---|---|---|---|
| 5,245,660 | 9/1993 | Pecora et al. ............................ | 380/48 |
| 5,432,697 | 7/1995 | Hayes ....................................... | 380/46 |
| 5,579,337 | 11/1996 | Grinstein et al. ........................ | 375/206 |
| 5,680,462 | 10/1997 | Miller et al. ............................. | 380/28 |
| 5,729,607 | 3/1998 | Defries et al. ........................... | 380/6 |
| 5,857,165 | 1/1999 | Corron et al. ........................... | 702/75 |
| 5,930,364 | 7/1999 | Kim .......................................... | 380/28 |

OTHER PUBLICATIONS

Newell et al., "Syncronization of Chaos Using Proportional Feedback", in "Chaos in Communications" Proceedings of the SPIE vol. 2038 pp. 115–130 (1993) edited by L. Pecora.

Kadtke et al., "Adaptive Methods for Chaotic Communication Systems", in "Chaos in Communications" Proceedings of the SPIE vol. 2038 pp. 182–193 (1993) edited by L. Pecora.

*Primary Examiner*—Pinchus M. Laufer
*Attorney, Agent, or Firm*—Staas & Halsey

[57] ABSTRACT

A synchronized chaotic system and a communication system using the synchronized chaotic system is disclosed. The synchronized chaotic system comprises a master chaotic part and a slave chaotic part, and a first synchronizing part connected to the master chaotic part and a second synchronizing part connected to the slave chaotic part. The first and second synchronizing parts preform operational functions to synchronize a chaotic signal output of the master chaotic part with a chaotic signal output of the slave chaotic part. Each of the first and second synchronizing parts includes a first scaler, a subtracter, a second scaler, and an adder. Each output of the adder is fed back to the main and slave chaotic parts. The synchronization occurs when the synchronized system consisting of the variable differences of the master and the slave chaotic parts generates infinite period of laminar phase which is connected with on-off intermittency. Also, the synchronized chaotic system is applied to a communication system for encryption. The communication system comprises a transmitter including the master part and the first synchronizing part and further including an adder to hide message signals in the chaotic signal, and a receiver including the slave part and the second synchronizing part and further including a subtracter to retrieve the message signal from the mixed signal.

8 Claims, 19 Drawing Sheets

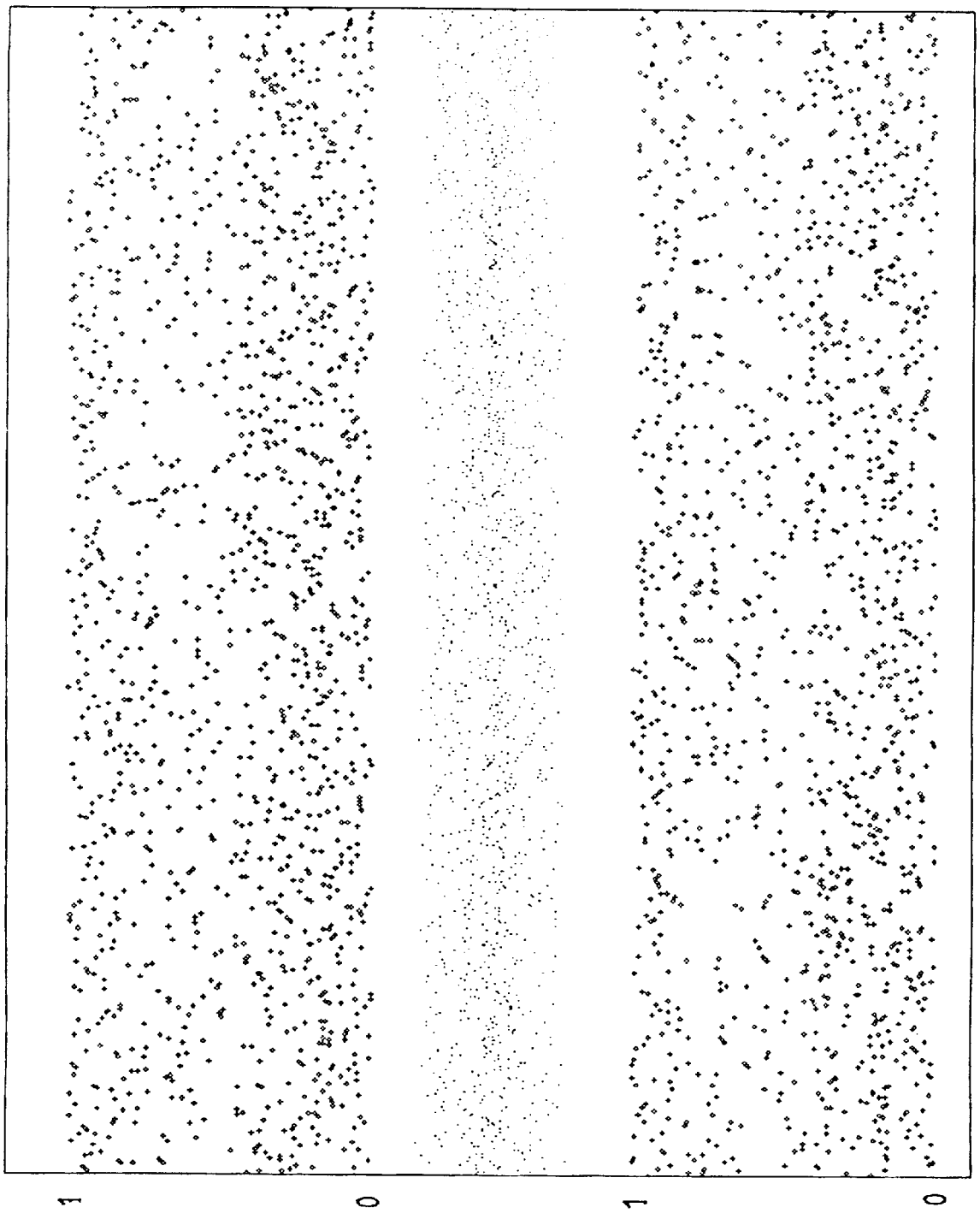

SYNCHRONIZED CHAOTIC SYSTEM AND COMMUNICATION SYSTEM USING SYNCHRONIZED CHAOTIC SYSTEM

FIELD OF THE INVENTION

The present invention relates to a synchronized chaotic system with synchronizing devices which synchronize chaotic signal output of a master chaotic part with chaotic signal output of a slave chaotic part wherein an external signal with noise or chaotic characteristics is inputted into each of the synchronizing devices and also relates to a communication system using the synchronized chaotic system.

Recently, a number of researches have been vigorously made to apply "Chaos Theory" to various industrial fields. Since systems evolving chaotically display sensitivity to initial conditions, when two substantially identical chaotic systems start with slightly different initial conditions, two identical systems quickly evolve to values with different trajectories which are vastly different and become totally uncorrelated as time evolves. This makes chaotic systems nonperiodic and unpredictable over long times. The phenomenon is due to the sensitivity to initial conditions (This is called "Butterfly Effect"). In chaotic systems, the synchronization means that state variables of one chaotic system become identical to state variables of another chaotic system to control the chaotic phenomenon. However, such systems are impossible to synchronize by conventional methods. Thus, new numerous methods have been proposed and developed to synchronize signals of nonlinear dynamical systems and also to apply the synchronized chaotic system to secure communication.

Considering known prior arts, methods are described in papers by Louis M. Pecora and Thomas L. Carroll entitled "Synchronization in Chaotic Systems" (PHYSICAL REVIEW LETTERS, Vol. 4 No. 8, p. 821, 1990) and entitled "Synchronizing Chaotic Circuits" (IEEE TRANSACTIONS CIRCUIT AND SYSTEMS, p. 453, April, 1991). These articles disclose a theory of synchronizing two chaotic systems and describe a circuit demonstrating such synchronization. Also, U.S. Pat. No. 5,245,660 to Pecora and Carroll discloses a system for producing synchronized signal.

FIG. 1 shows the synchronization concept disclosed in U.S. Pat. No. 5,245,660 to Pecora and Carroll. Referring to FIG. 1, the concept suggests as an application the linking of two systems, each with internal signals behaving chaotically, yet in synchronization. A primary system 1 as a master chaotic part is divided into first subsystem 2 as a drive signal generator and second subsystem 3. A new subsystem 3' identical to the subsystem 3 is linked with the primary system 1, there forming a response subsystem 1' as a slave chaotic part. The master and slave parts construct an overall chaotic system. The driving output signal X4 of the first subsystem 2 is transmitted to the second subsystem 3 and response subsystem 3' to synchronize the second subsystem 3 with the response subsystem 3' wherein the variables X1', X2', X3' of the response subsystem 3' correspond to the variables X1, X2, X3 of the second subsystem 3. As a result, the variables X1', X2', X3', X4' of the slave part 1' and the variables X1, X2, X3, X4 of the master part 1 are in synchronization with each other. In summary, U.S. Pat. No. 5,245,660 according to Pecora and Carroll suggests a synchronizing method wherein one variable of the slave part is substituted by one variable of the master part to synchronize the master chaotic part with the slave chaotic part.

On the other hand, synchronization in chaotic systems has high potentiality of practical applications in secure communication, optics, and nonlinear dynamics model identification. In the secure communication field, numerous schemes have been proposed to make radio communications relatively immune to interference and secure from undesired listeners. Specially, the secure communication using a synchronizing system is disclosed in U.S. Pat. No. 5,291,555 to Cuomo and Oppenheim which employs the synchronizing concept of Pecora and Carroll thereto.

FIG. 2 shows the communication system disclosed in U.S. Pat. No. 5,291,555 to Cuomo and Oppenheim. The communication system comprises a chaotic transmitter 10 including a drive signal generator 12 for producing a chaotic drive signal u(t) and an adder 14 for adding message signal m(t) to the drive signal u(t) to produce a transmitted signal, and a receiver 20 for receiving the transmitted signal including a drive signal regenerator 22 for reconstructing the drive signal u'(t) from the received signal u(t)+m(t), and a subtracter 24 for subtracting the reconstructed drive signal u'(t) from the received signal u(t)+m(t) to detect therefrom message signal m'(t).

However, the aforedescribed known prior art of Pecora and Carroll has the drawback that the overall chaotic system including the master and slave parts has a strong tendency to easy synchronization in spite of somewhat different parameters between the master and slave parts since the drive signal of the driving generator is without any conversion inputted into the response subsystem to synchronize two chaotic systems. Explaining it another way, when the subsystem is satisfied with the synchronizing condition proposed by Pecora and Carroll that the Lyapunov exponents of the subsystem are all negative, the overall system may be easily synchronized even though the parameters of the circuit elements constructing the response system are variable to a certain degree, for example, 20 percent. Thus, the prior art of Cuomo and Oppenheim employing the synchronizing concept of Pecora and Carroll also has the drawback that the transmitted message signal may be wiretapped since it is relatively easy to reproduce the communication apparatus on account of the strong synchronization tendency.

SUMMARY OF THE INVENTION

The present invention is directed to overcome the drawback as set forth above.

It is an object of the present invention to provide a synchronized chaotic system wherein a master part is synchronized with a slave part by feeding arbitary external noise or high-dimensional chaotic signal as control signal to a variable or variables of the two identical chaotic parts at strict conditions that the variable difference of the master part and the slave part illustratess infinite period of laminar phase which is connected with on-off intermittency.

It is further object of the present invention to provide a communication system using the synchronized chaotic system according to the present invention to achieve secure communication.

According to the present invention, these objects are achieved. There is provided a synchronized chaotic system comprising a master part for generating first chaotic signal with chaotic characteristics, state variables of said master part being functionally interrelated; a slave part identical to said master part for generating second chaotic signal with chaotic characteristics corresponding to the first chaotic signal, state variables of said slave part being functionally interrelated; first synchronizing means for receiving at least one variable of said master part and an external signal with noise or chaotic characteristics and for modulating the at least one variable of said master part by the external signal with noise or chaotic characteristics and for feedbacking the at least one variable of said master part modulated by the external signal with noise or chaotic signal to said master part; and second synchronizing means for receiving at least one variable of said slave part corresponding to the at least one variable of said master part and the external signal with noise or characteristics and for modulating the at least one variable of said slave part by the external signal with noise or chaotic characteristics and for feedbacking the at least one variable of said slave part modulated by the external signal with noise or chaotic characteristics to said slave part.

Also, there is provided a communication system using a synchronized chaotic system comprising a transmitter including a master part for producing first chaotic signal with chaotic characteristics, state variables of said master part being functionally interrelated, a first synchronizing means for receiving at least one variable of the master part and an external signal with noise or chaotic characteristics and for modulating the at least one variable of the master part by the external signal with noise or chaotic characteristics and for feedbacking the at least one variable modulated of the master part by the external signal with noise or chaotic characteristic to the master part, and an adder for adding a message signal to the first chaotic signal of the master part to produce a masked signal; and a receiver including a slave part identical to the master part for reproducing second chaotic signal with chaotic characteristics corresponding to the first chaotic signal, state variables of said master part being functionally interrelated, a second synchronizing means for receiving at least one variable of the slave part corresponding to the at least one variable of the slave part and the external signal with noise or chaotic characteristics and for modulating the at least one variable of the slave part by the external signal and for feedbacking the at least one variable of the slave part modulated by the external signal with noise or chaotic characteristics to the slave part, and a subtracter for removing the second chaotic signal of the slave part which is synchronized with the first chaotic signal of the master part from the masked signal of the adder to detect the message signal.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 10A to FIG. 10C are wave form charts of the state variables of the master part and the slave part and the difference therebetween when the master part and the slave part are not in synchronization with each other in a coupled map;

DETAILED DESCRIPTION OF THE PREFERRED EMBODIMENTS

This invention will be described in further detail by way of embodiments with reference to the accompanying drawings.

In general, mathematical models of chaotic systems often involve two types of systems, that is, the systems expressed as difference equations and the systems expressed as differential equations. The systems of the differential equations include a well known Lorenz system, a Rö"ssler system, a Duffing system, and etc. The logistic map is well known as a system of the difference equation. The chaotic systems are functionally defined in terms of state variables which are used to construct a main electronic circuit in the chaotic system. Those skilled in the art can easily construct electronic circuits in correspondence to arbitrary chaotic systems defined in terms of the state variables. For example, the electronic circuit corresponding to well known Lorenz system is disclosed in U.S. Pat. No. 5,291,555, and can be expressed as the following equation.

$$\dot{u} = \sigma(v - u) \qquad (1)$$
$$\dot{v} = ru - v - 20uw$$
$$\dot{w} = 5uv - bu$$

The electronic circuits corresponding to Rö"ssler and modified Duffing systems are disclosed in U.S. Pat. No.

5,402,334, and an encryption technology using the logistic map is disclosed in U.S. Pat. No. 5,048,086.

Figure 1:
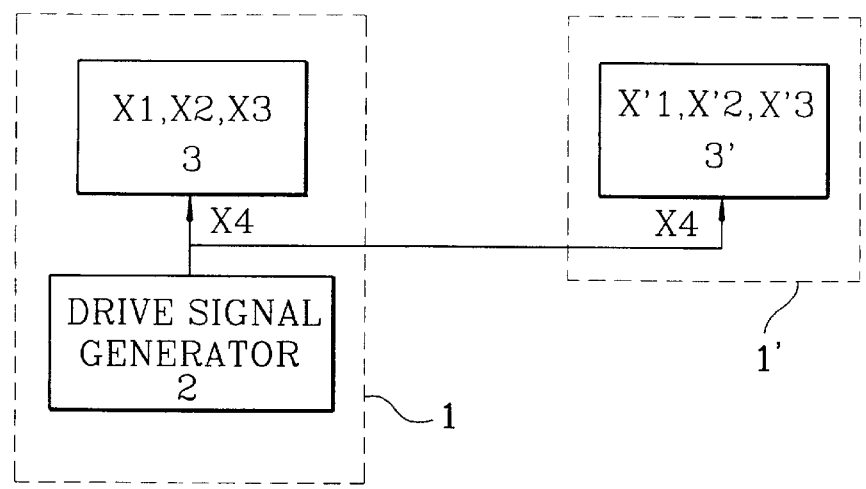
FIG. 1 is a block diagram illustrating synchronization concept according the prior art proposed by Pecora and Carroll.
Figure 2:
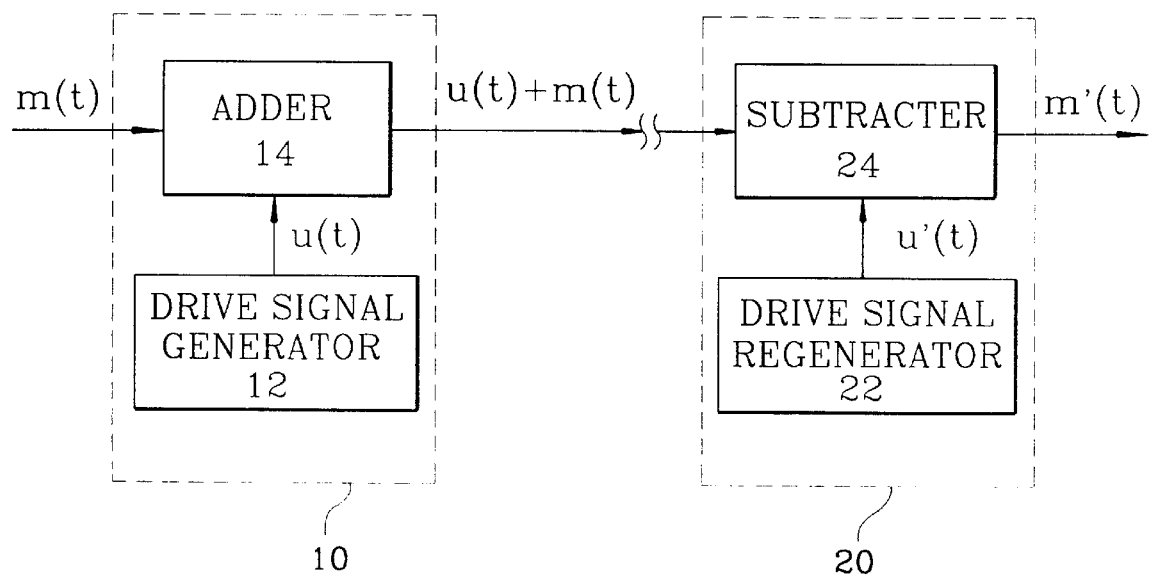
FIG. 2 is a block diagram of the communication system using the synchronized chaotic system according to the prior art.
Figure 3:
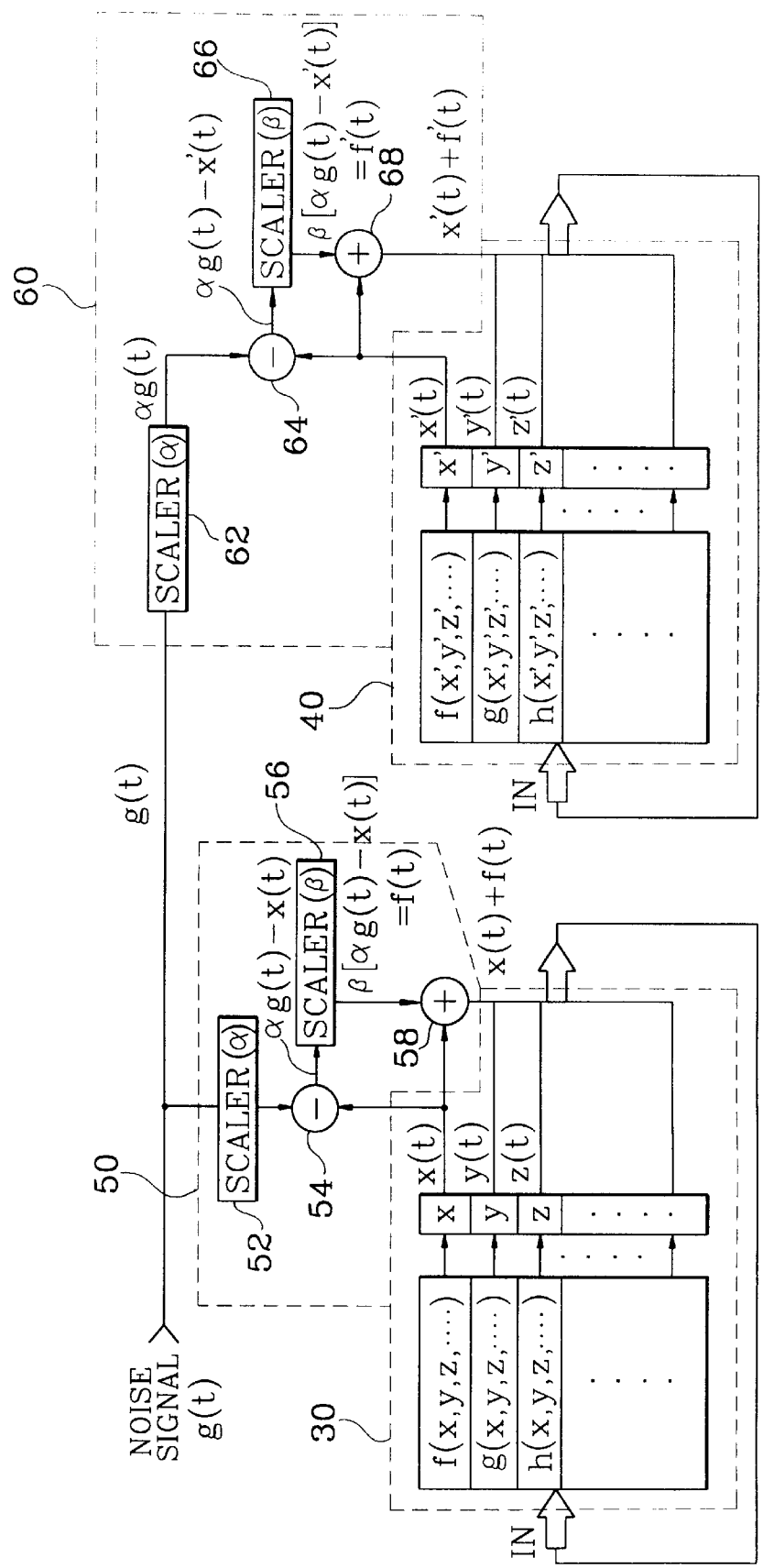
FIG. 3 is an operational diagram explaining synchronization concept of a synchronized chaotic system according to the present invention.

Referring to FIG. 3, a master part 30 is given as n-dimensional state variables x(t), y(t), z(t), . . . and a slave part 40 identical to the master part 30 is given as n-dimensional state variables x'(t), y'(t), z'(t), . . . corresponding to the n-dimensional state variables x(t), y(t), z(t), . . . The master part 30 is synchronized with the slave part 40 by modulating an external signal g(t) with noise or chaotic characteristics and arbitrary variables among the states variables of the master part 30 and arbitrary variables among the states variables of the slave part 40 corresponding to the arbitrary variables of the master part 30, respectively and by feedbacking the modulated signal to the master part 30 and the slave part 40, respectively.

A first synchronizing part 50 and a second synchronizing part 60 are provided to synchronize the master part 30 with the slave part 40. The first synchronizing part 50 includes a first scaler 52 for scaling the external signal g(t) with noise or chaotic characteristics by a first scaling factor $\alpha$, a subtracter 54 for subtracting the arbitrary state variables, in this embodiment one state variable x(t), of the master part 30 from the scaled external signal $\alpha g(t)$, a second scaler 56 for scaling an output signal $\alpha g(t)-x(t)$ of the subtracter 54 by a second scaling factor $\beta$, and an adder 58 for adding the variable x(t) of the master part 30 to an output signal $f(t)=\beta[\alpha g(t)-x(t)]$ of the second scaler 56 and for feedbacking an output signal f(t)+x(t) of the adder 58 to the master part 30. The second synchronizing part 60 includes a first scaler 62 for scaling the external signal g(t) with noise or chaotic characteristics by a first scaling factor $\alpha$, a subtracter 64 for subtracting an arbitrary variable x'(t) of the slave part 40 corresponding to the variable x(t) of the master part 30 from the scaled external signal $\alpha g(t)$, a second scaler 66 for scaling an output signal $\alpha g(t)-x'(t)$ of the subtracter 64 by a second scaling factor $\beta$, and an adder 68 for adding the variable x'(t) of the slave part 40 to an output signal $f'(t)=\beta[\alpha g(t)-x'(t)]$ of the second scaler 66 and for feedbacking an output signal f'(t)+x'(t) of the adder 68 to the slave part 40.

Since the initial conditions of the two identical chaotic parts 30 and 40 are not identical to each other, the master part 30 and the slave part 40 will have different trajectories as time evolves without the first synchronizing part 50 and the second synchronizing part 60. According to the present invention, the master part 30 and the slave part 40 will have identical trajectories by means of the first synchronizing part 50 and the second synchronizing part 60. In other words, the corresponding variables x(t) and x'(t), y(t) and y'(t), z(t) and z'(t), . . . of the master and slave parts 30 and 40 will have identical trajectories.

As described above, when the master part 30 is synchronized with the slave part 40 by the first synchronizing part 50 and the second synchronizing part 60, resulting in x(t)=x'(t) and y(t)=y'(t) and z(t) =z'(t). That is, the values of the state variables of the master part 30 becomes identical to those of the corresponding state variables of the slave part 40. On the other hand, the feedbacked signal to the master part 30 becomes $x(t)+f(t)=x(t)+\beta[\alpha g(t)-x(t)]$ and the feedbacked signal to the slave part 40 becomes $x'(t)+f'(t)=x'(t)+\beta[\alpha g(t)-x'(t)]$. Therefore, the first synchronizing part 50 results in x(t)=x(t)+f(t) in the master part 30 and the second synchronizing part 60 results in x'(t)=x'(t)+f'(t) in the slave part 40. This method of synchronizing two chaotic parts is a kernel technology of the chaotic system according to the present invention.

Now, preferably, a Lorenz equation is considered for a practical application to embody a synchronizing system.

Figure 4:
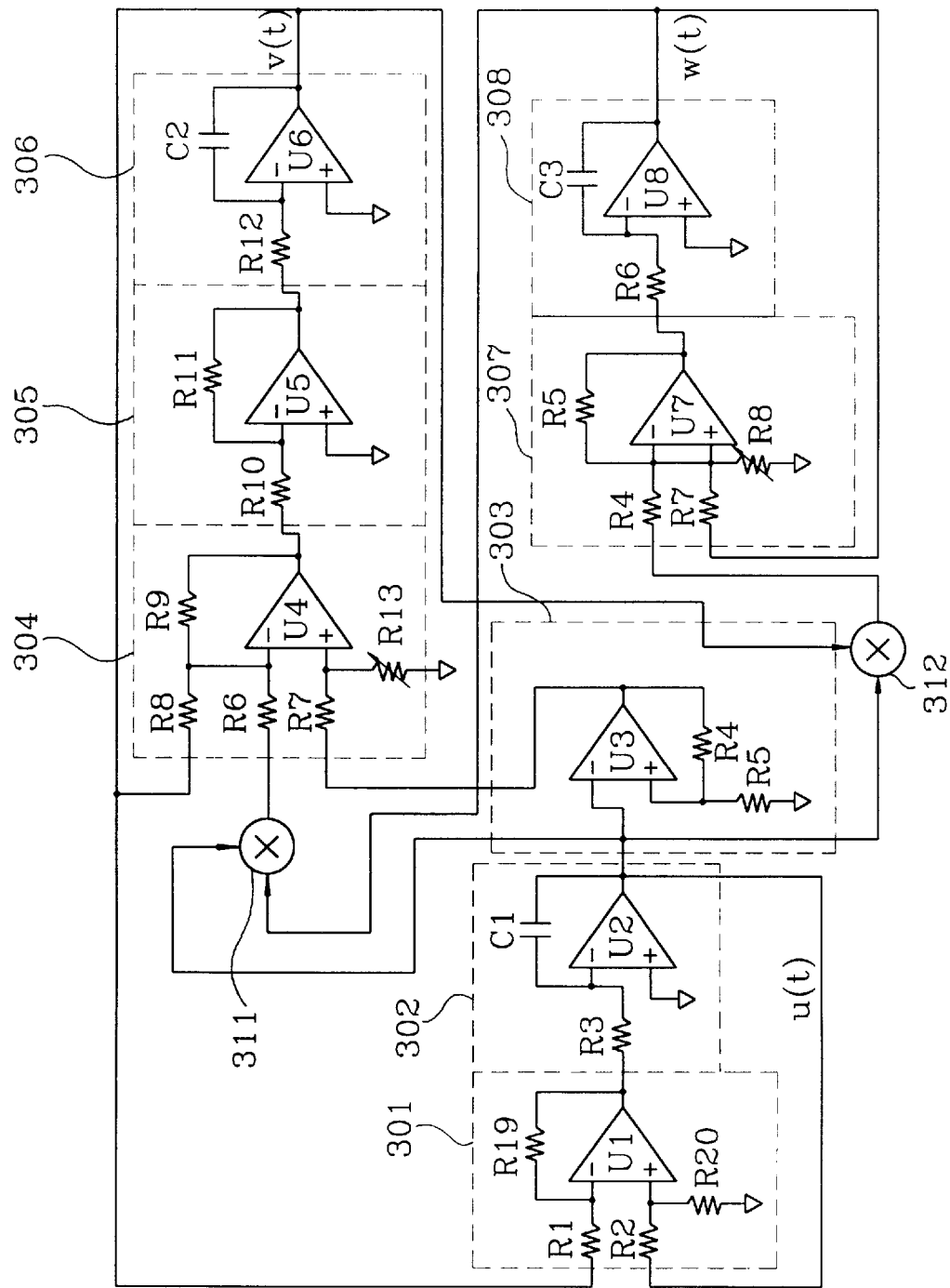
FIG. 4 is a circuit diagram of a chaotic system implementing Lorenz equation adapted to realize the present invention.

FIG. 4 shows a circuit diagram of a chaotic part embodying the Lorenz equation. The circuit 300, as shown in FIG. 4, includes a plurality of operational amplifiers and two analog multipliers.

A first operational amplifier 301 receives a signal v(t) inputted into an inverting terminal thereof via a resistor R1 and also receives a signal u(t) inputted into a non-inverting terminal thereof via a resistor R2 to operate and amplify the signals u(t) and v(t) by values of the resistors. The output of the first operational amplifier 301 is applied via a variable resistor R3 to a second operational amplifier 302 which is connected to a capacity C1 to integrate the output of the first operational amplifier 301.

A first analog multiplier 311 multiplies the signal u(t) of the output of the second operational amplifier 302 by a signal w(t) and a third operational amplifier 303 receives the signal u(t) inputted into an inverting terminal thereof and non-invertingly amplifies the inputted signal u(t) in accordance with the ratio of a resistor R4 to a resistor R5. A fourth operational amplifier 304 receives via a resistor R6 the multiplied signal u(t)·w(t) inputted into an inverting terminal thereof and also receives via a resistor R7 the output signal of the third operational amplifier 303 inputted into a non-inverting terminal thereof to operate and amplify the inputted signals by values of the resistors. A fifth operational amplifier 305 receives via a resistor R10 the output signal inputted into an inverting terminal thereof and non-invertingly amplifies the output signal of the fourth operational amplifier 304 in accordance with the ratio of a resistor R10 to a resistor R11. The output of the fifth operational amplifier 305 is applied to a sixth operational amplifier 306 which is connected to a capacity C2 to integrate the output of the fifth operational amplifier 305 and to output a signal v(t).

A second analog multiplier 312 multiplies the signal u(t) by the signal v(t). A seventh operational amplifier 307 receives via a resistor R15 the multiplied signal u(t)·v(t) inputted into an inverting terminal thereof and also receives via a resistor R18 the signal w(t) inputted into a non-inverting terminal thereof to operate and amplify the inputted signals by values of the resistors. The output of the seventh operational amplifier 307 is applied to a eighth operational amplifier 308 which is connected to a resistor R17 and a capacity C3 to integrate the output of the seventh operational amplifier 307 and to output the signal w(t).

Figure 5A:
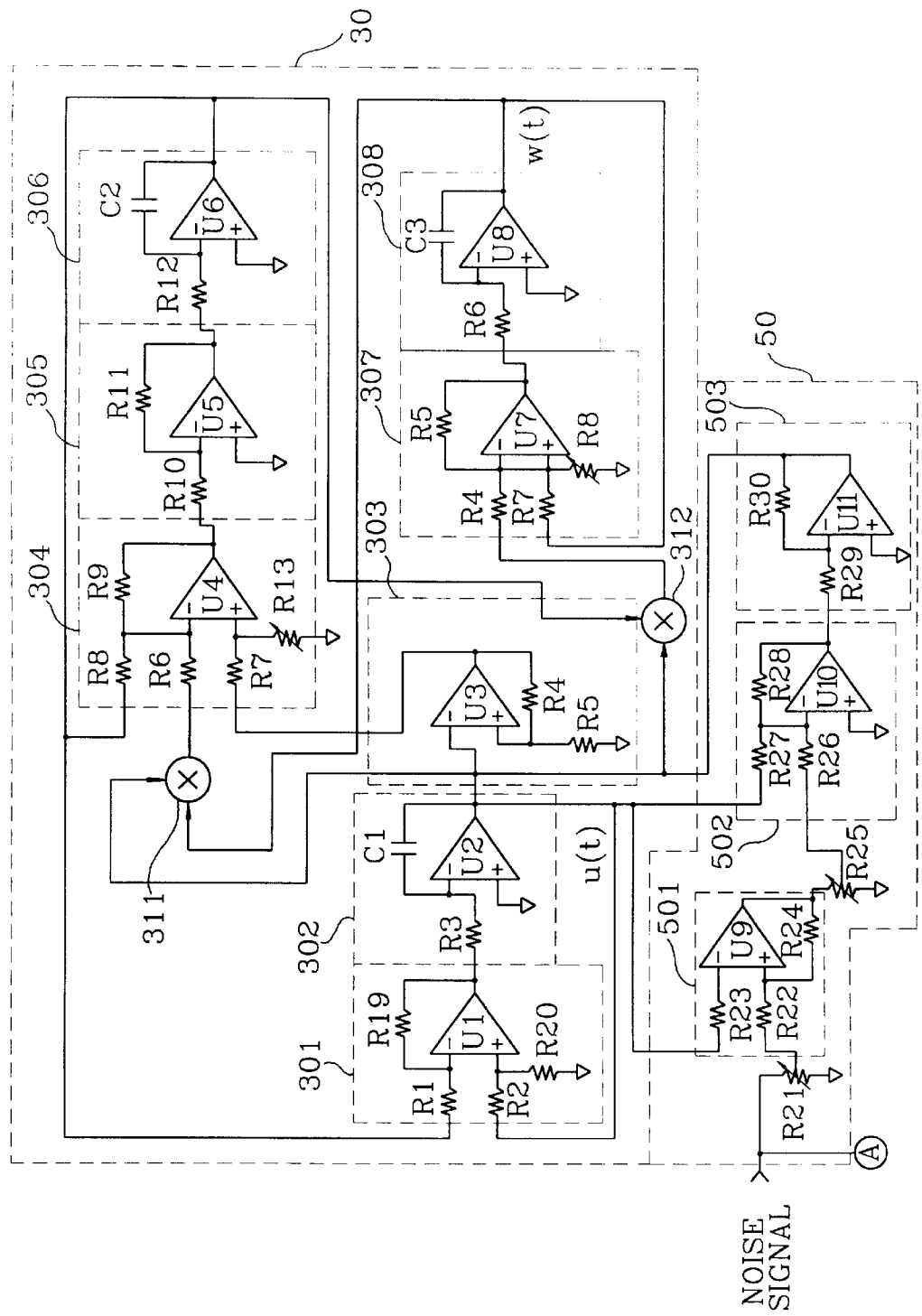
FIG. 5A and FIG. 5B are circuit diagrams embodying a synchronized chaotic system according to the present invention.
Figure 5B:
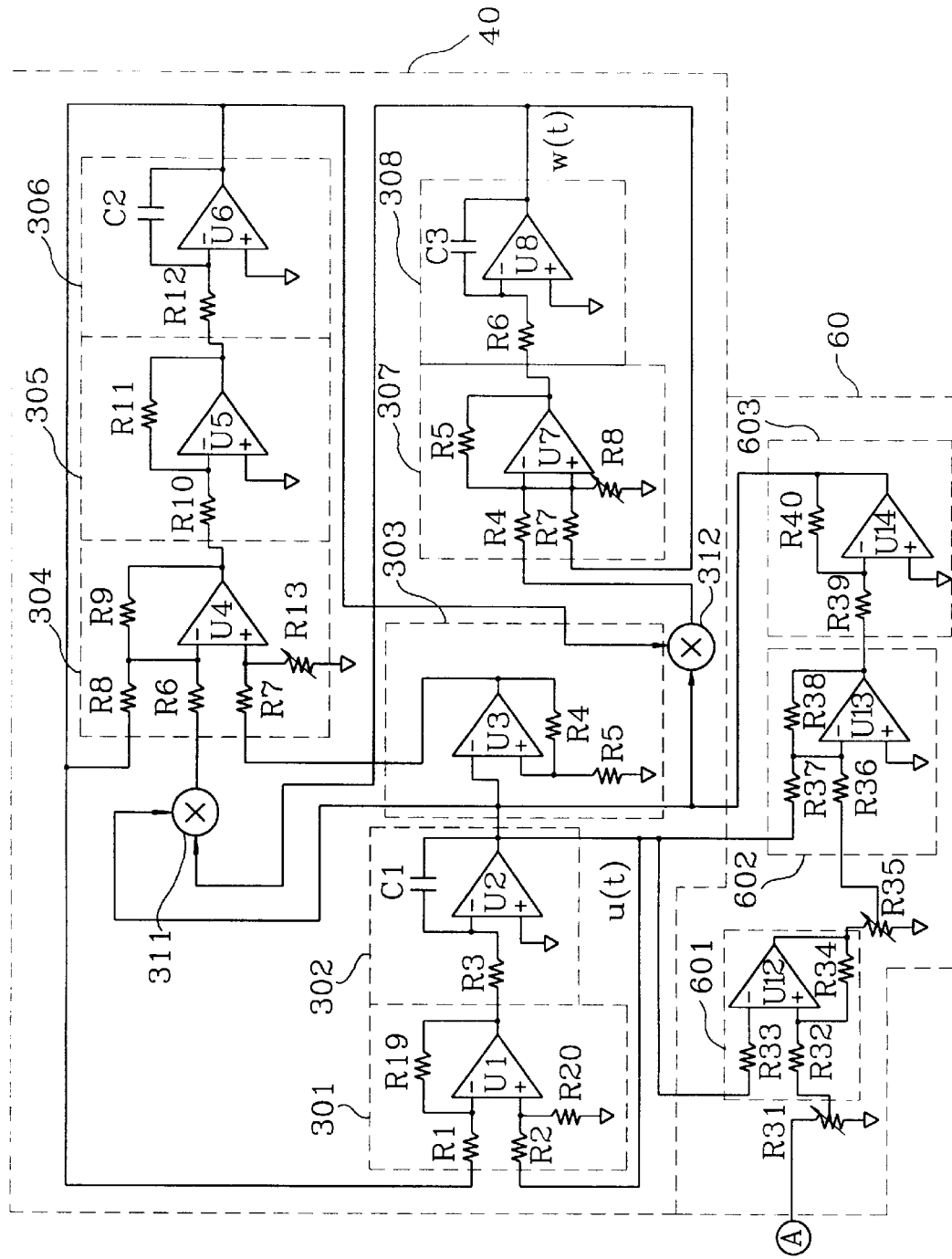

Each of the master part 30 and the slave part 40 has the circuit diagram shown in FIG. 4. According to the present invention, a circuit for generating external noise signals or chaotic signals is added to the master part 30 to synchronize the master part 30 and the slave part 40. For example, the external noise signals may be chaotic signals generated by a circuit of Rössler system, a circuit of Duffing system, and a circuit of Navier-Stoke system, etc. Those ordinally skilled in the art can easily construct electronic circuits in corresponding to the chaotic systems in terms of state variables. On the other hand, an arbitrary noise signal may be employed as a synchronizing signal by filtering the noise signal to have an adequate frequency band. The external noise signal or chaotic signal is applied to each of the first synchronizing part 50 and the second synchronizing part 60 and the applied external noise signal or chaotic signal is scaled by a scaling factor. The state variables x(t) and x'(t) of the master part 30 and the slave part 40 are subtracted from the amplified noise signal or chaotic signal and then the subtracted signal is scaled by another scaling factor. Thereafter, the state variables x(t) and x'(t) of the master part 30 and the slave part 40 is added to the scaled signal, respectively and the added signal is feedbacked to the master part 30 and the slave part 40, respectively. Therefore, two chaotic parts are in synchronization with each other to have identical trajectories. FIG. 5A and FIG. 5B show circuits embodying a synchronized chaotic system according to the present invention. FIG. 5A shows the circuits of the master part 30 and the first synchronizing part 50 and FIG. 5B shows the circuits of the slave part 40 and the second synchronizing part 60.

Referring to FIG. 5A, first of all, the circuit of the master part 30 is identical to that of the chaotic part embodying the Lorenz equation. The first synchronizing part 50 comprises a variable resistor R21 corresponding to the first scaler 52 of FIG. 3, a ninth operational amplifier 501 having an operational amplifier U9 and a peripheral circuit corresponding to the subtracter 54 of FIG. 3, a variable resistor R25 corresponding to the second scaler 56 of FIG. 3, a tenth operational amplifier 502 having an operational amplifier U10 and a peripheral circuit corresponding to the adder 58 of FIG. 3, an eleventh operational amplifier 503 having an operational amplifier U11 and a peripheral circuit to invertingly amplify the output of the tenth operational amplifier 502.

Referring to FIG. 5B, first of all, the circuit of the slave part 40 is identical to that of the chaotic part embodying the Lorenz equation. The second synchronizing part 60 comprises a variable resistor R31 corresponding to the first scaler 62 of FIG. 3, a twelfth operational amplifier 601 having an operational amplifier U12 and a peripheral circuit corresponding to the subtracter 64 of FIG. 3, a variable resistor R35 corresponding to the second scaler 66 of FIG. 3, a thirteenth operational amplifier 602 having an operational amplifier U13 and a peripheral circuit corresponding to the adder 58 of FIG. 3, a fourteenth operational amplifier 603 having an operational amplifier U14 and a peripheral circuit to invertingly amplify the output of the thirteenth operational amplifier 602.

Hereinafter, the operation of the preferred embodiment with the constitution as described above will be explained in detail.

The well-known Lorenz equation is applied to the present invention and a set of following equations (2) represents a 3-dimensional Lorenz system with nonlinear terms xy and xz.

$$\frac{dx}{dt} = -\sigma(x - y) \quad (2)$$

$$\frac{dy}{dt} = Rx - y - xz$$

$$\frac{dz}{dt} = -bz + xy$$

where x, y and z are state variables, and σ, R and b are parameters. When σ=10, R=8/3 and b=8, the system generates chaotic signals. At this time, when the master chaotic part is given as the eq. (2), the slave chaotic part which is identical to the master chaotic part in the circuit constitution and is different from the master chaotic part in the trajectories of the state variables may be given as a set of following equations (3).

$$\frac{dx'}{dt} = -\sigma(x' - y') \quad (3)$$

Figures 6A, 6B:
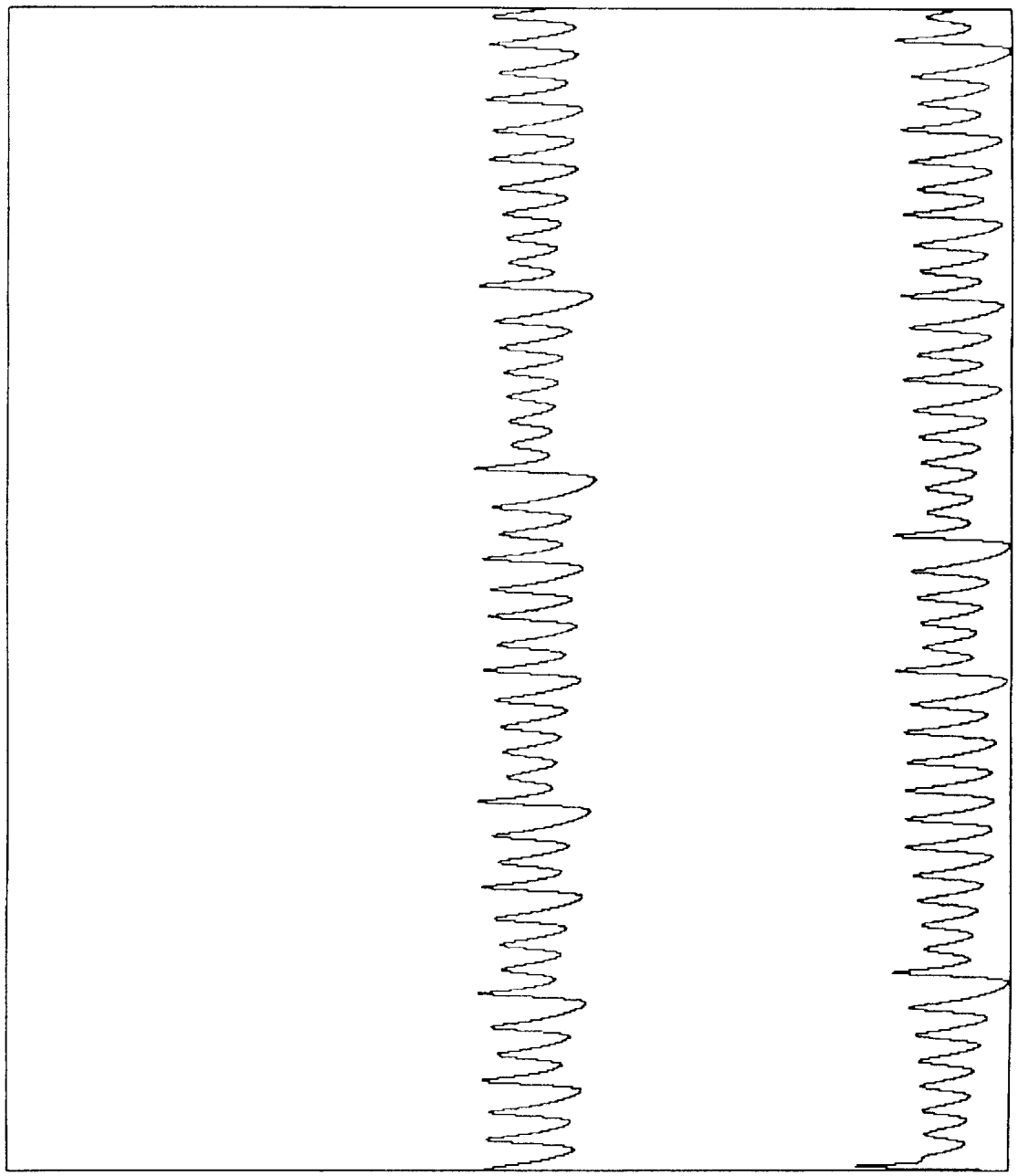
FIG. 6A and FIG. 6B are wave form charts of a state variable of a master part and a state variable of a slave part corresponding to the state variable of the master part, respectively prior to the synchronization.

-continued $$\frac{dy'}{dt} = Rx' - y' - x'z'$$

$$\frac{\partial z'}{\partial t} = -bz' + x'y'$$

where the parameters of the slave part is identical to those of the master part. When the initial conditions of the state variables x,y,z and x',y',z' are differently set up, the master part is independent of the slave part and the master part and the slave part have different trajectories as time evolves. For example, considering the state variable x of the master part and the state variable x'of the slave part, from FIG. 6A and FIG. 6B, it is recognized that the variables x and x' have different trajectories as time evolves wherein FIG. 6A is a wave form chart of the state variable of the master part and FIG. 6B is a wave form chart of the state variable of the slave part corresponding to the state variable of the master part, respectively prior to the synchronization.

However, when the first and second synchronizing parts are connected to the master and slave parts, respectively to synchronize the master part with the slave part and the noise signal or chaotic signal is applied to the state variables x and x' of the master and slave parts as described above in accordance with FIG. 3, the master part is given as a set of equations (4) and the slave part is given as a set of equations (5).

$$\frac{dx}{dt} = -\sigma((x + f(t)) - y) \quad (4)$$

$$\frac{dy}{dt} = R((x + f(t)) - y - (x + f(t))z$$

$$\frac{dz}{dt} = -bz + (x + f(t))y$$

$$\frac{dx'}{dt} = -\sigma((x' + f'(t)) - y) \quad (5)$$

$$\frac{dy'}{dt} = R((x' + f'(t)) - y - (x' + f'(t))z$$

$$\frac{dz'}{dt} = -bz + (x' + f'(t))y$$

Here, the synchronization of the master part and the slave part means that the state variables of the master part and those of the slave part corresponding to the state variables of the master part have identical trajectories as time evolves, that is, resulting in x=x', y=y' and z=z'. The synchronization can be ascertained by the computer simulation.

Figures 7A, 7B, 7C, 7D:
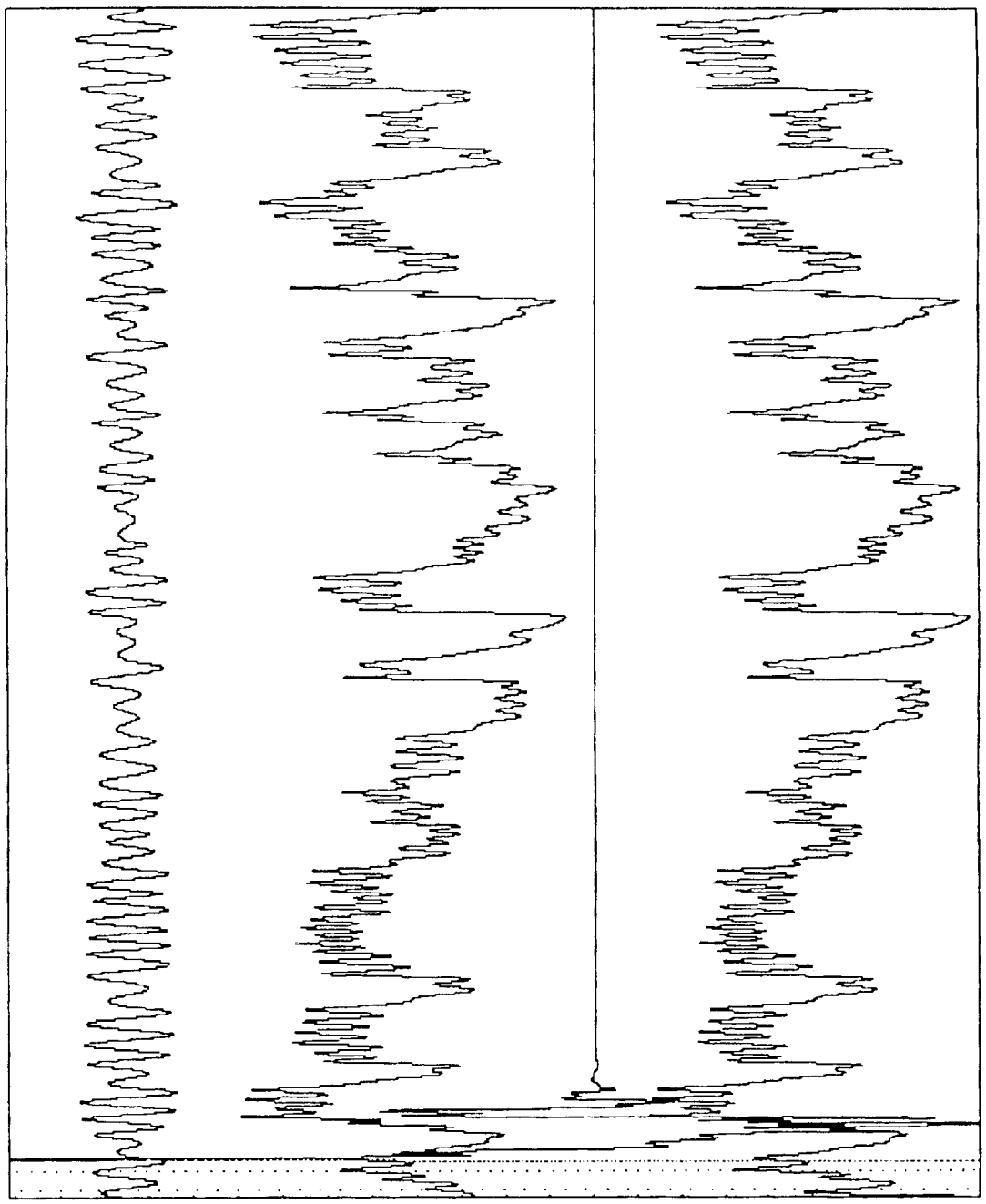
FIG. 7A to FIG. 7D are wave form charts of a noise signal and the state variables of the master part and slave part and the difference therebetween when the master part and slave part are in synchronization with each other.

The external noise signal or chaotic signal inputted into the master part and the slave part has values from 0 to 1 generated by a random number generator. The noise signal has a sine wave expressed as Asin(ωt) where one random number has a magnitude A of the noise signal and the other random number has a frequency ω. Accordingly, the scaled noise signal becomes αAsin(ωt) and is used as a synchronizing signal. FIG. 7A to FIG. 7D are wave form charts explaining the synchronization which is carried out by the external noise signal according to the present invention. FIG. 7A is a wave form chart of a trajectory of the noise signal and FIG. 7B is a wave form chart of a trajectory of the state variable of the master part and FIG. 7C is a wave form chart of a trajectory of the difference between the state variables of the master part and the slave part and FIG. 7D is a wave form chart of a trajectory of the state variable of the slave part when the master part and slave part are in synchronization with each other.

Referring to FIG. 7A to FIG. 7D, when the master part and the slave part are in synchronization with each other, the state variable x of the master part is identical to the state variable x' of the slave part since the chaotic signal of the master part becomes immediately identical to the chaotic signal of the slave part. FIG. 7C shows the wave form chart of the trajectory of the difference between the state variables of the master part and the slave part which is enlarged by 10,000 times and from FIG. 7C it can be recognized that the difference converges immediately to zero. And it can be recognized that the chaotic signals of the master part and the slave part after the synchronization are different from those of the master part and the slave part before the synchronization.

From now on, chaotic attractors of two chaotic systems in a phase space of y-z plane are examined to see how much the difference between the chaotic signals after and before the synchronization exists.

Figure 8A:
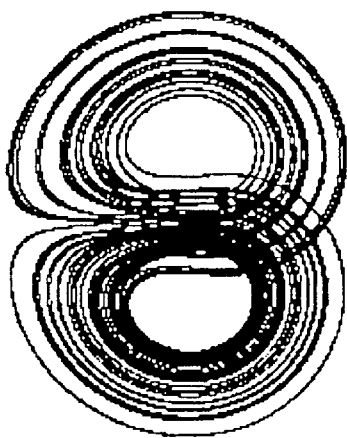
FIG. 8A and FIG. 8B show shapes of chaotic attractors in y-z phase space before and after the synchronization.
Figure 8B:
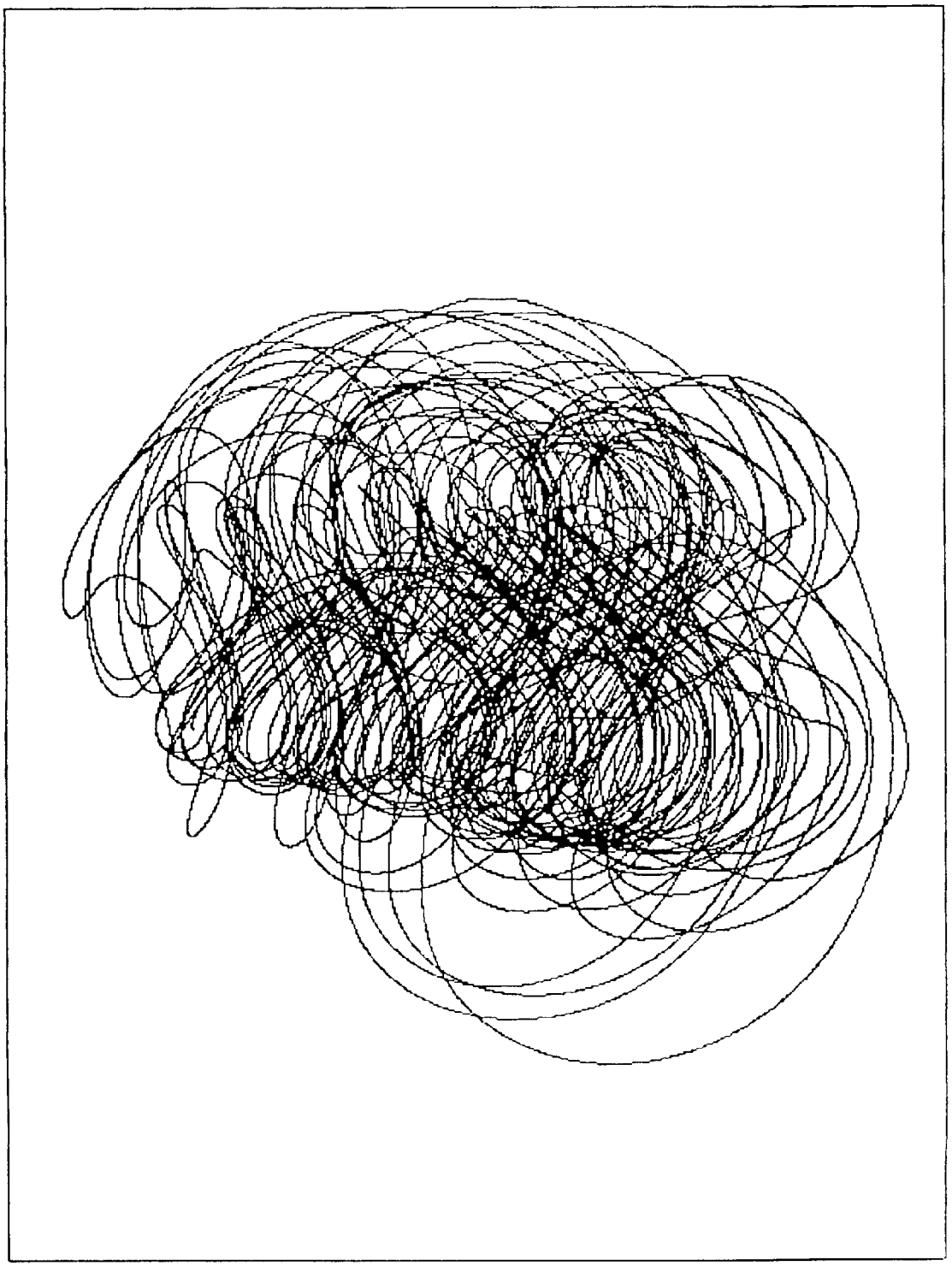
Figure 9A:
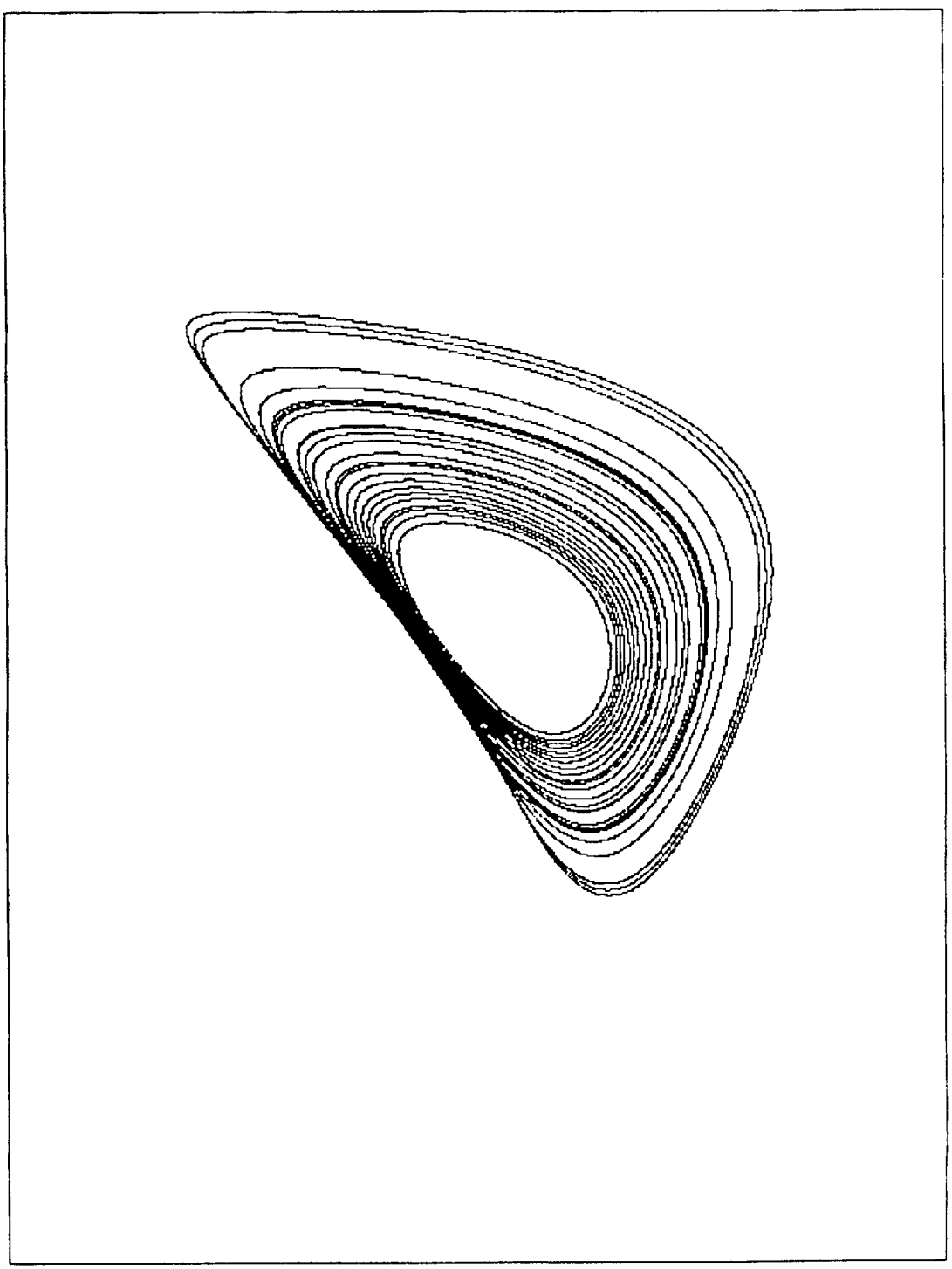
FIG. 9A and FIG. 9B show shapes of chaotic attractors in time delay phase space of z(t)–z(t+τ) of a case where there is no noise and a case where the master part and the slave part are in synchronization with each other by the noise when z is a feedback signal.
Figure 9B:
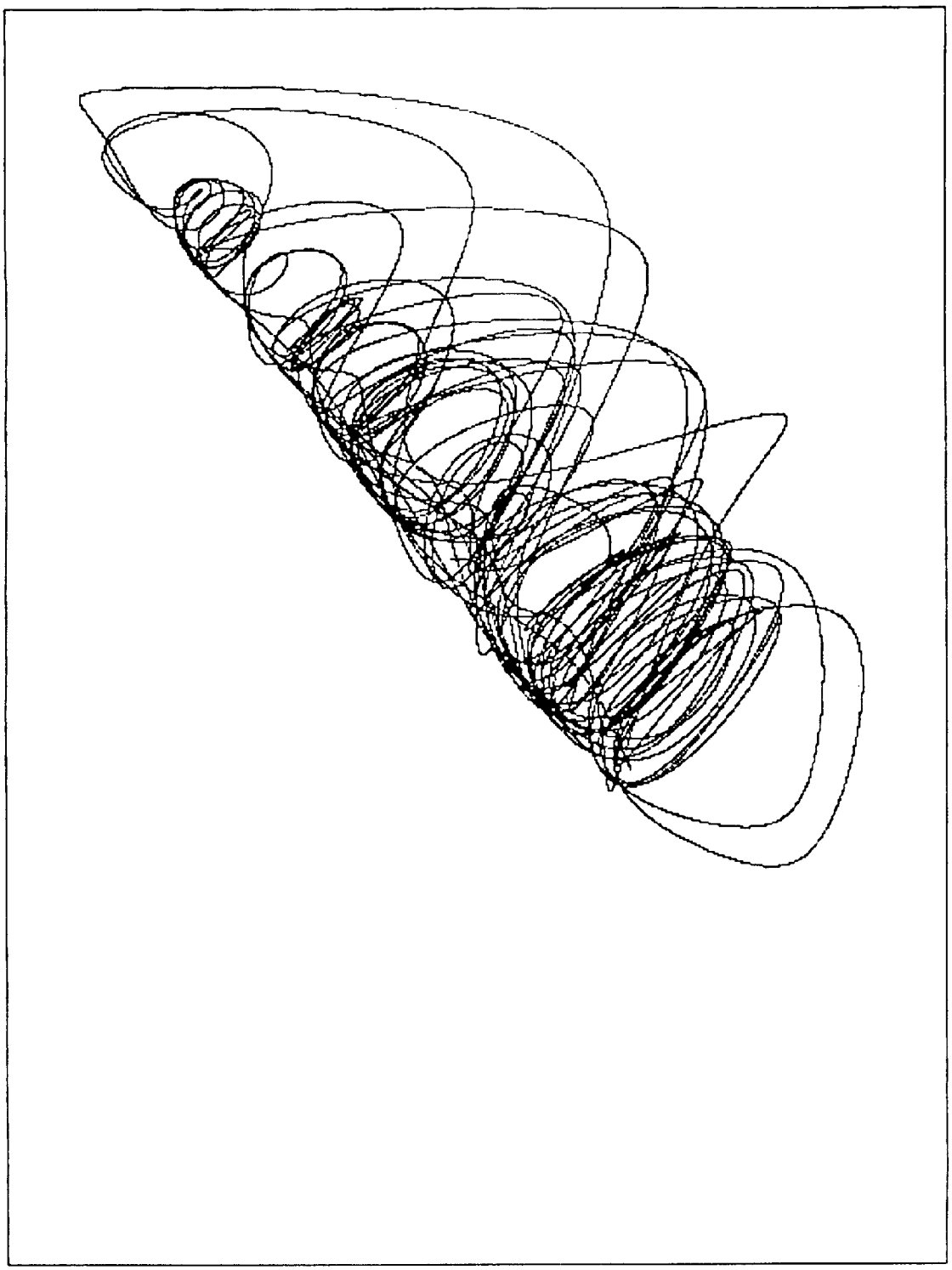

Referring to FIG. 8A and FIG. 8B, FIG. 8A and FIG. 8B show shapes of chaotic attractors in y-z phase space before and after the synchronization. FIG. 8A illustrates a normal attractor of the Lorenz system before the synchronization. However, FIG. 8B illustrates an attractor after the synchronization analogous to a very complex noise which has not a fractal shape of the general chaotic attractor and the original shape of the normal attractor cannot be discovered in the changed attractor shown in FIG. 8B. And, when z and z' are used as the feedback variables of the master and slave chaotic systems, FIG. 9A shows a shape of a chaotic attractor in time delay phase space of $z(t)-z(t+\tau)$ of a case where there is no noise and FIG. 9B shows a shape of a chaotic attractor in time delay phase space of $z(t)-z(t+\tau)$ of a case where the master system and the slave system are in synchronization with each other by the noise. In FIG. 9A and FIG. 9B, $\tau$ has a value 0.5 as an example. However, FIG. 9B illustrates an attractor after the synchronization analogous to a very complex noise which has not a fractal shape of the general chaotic attractor and the original shape of the normal attractor cannot be discovered in the changed attractor shown in FIG. 9B.

On the other hand, the principle of the synchronization using a logistic map will be described in detail. The logistic map is given as a following equation (6).

$$X_{n+1}=\alpha x_n(1-x_n) \quad (6)$$

In eq. (6), the chaos is determined in accordance with values of $\alpha$. For example, when $\alpha=3.9$ the system shows a chaotic characteristic. At this time, one slave chaotic system is given as $x'_{n+1}=\alpha x_n(1-x_n)$ and it is assumed that the two chaotic systems are synchronized by random numbers. When the random numbers $r_n$ have values from 0 to 1, the value feedbacked to the master chaotic system becomes $f_n=\beta(r_n-x_n)$ and the value feedbacked to the slave chaotic system becomes $f'_n=\beta(r_n-x'_n)$. Then, the master chaotic system and the slave chaotic system are given as following equations (7) and (8), respectively.

$$x_{n+1}=\alpha(x_n+f_n)(1-(x_n+f(n))) \quad (7)$$
$$x'_{n+1}=\alpha(x'_n+f_n)(1-(x'_n+f(n))) \quad (8)$$

From eqs. (7) and (8), letting us consider $y_n=x_n-x'_n$, the difference of the variables can be constructed. That is, $$Y_{n+1}=\alpha(1-\beta)[1-2(1-\beta)x_n-2\beta r_n]y_n+\alpha(1-\beta)^2 y^2_n \quad (9)$$

The eq. (9) governs a new nonlinear difference equation defined as a new chaotic system. In eq. (9), the parameter variable $y_n$ is modulated by the variables $x_n$ and $r_n$ of the master chaotic system. On the other hand, the method of modulating parameters of the nonlinear system by the noise signal or the chaotic signal may be selected among well known methods. Therefore, the detailed descriptions thereof are omitted in here.

Analyzing the phenomena of the system in which the parameters are modulated in terms of the chaotic signal or noise signal, the system assumes very complicated phenomena. The inverted system irregularly oscillates from the chaotic signal to the value very close to zero, or converges to zero, or appears chaotic. The oscillation from the chaos to the value very close to zero is defined as on-off intermittency. There is a critical value condition that the system including the variable differences of two chaotic systems generates infinite period of laminar phase which is connected with on-off intermittency. At a value above the critical value $\alpha_c$, the new chaotic system immediately converges to zero. Accordingly, the new chaotic system is synchronized with the master part since the differences between two identical variables become zero. That is, when $\alpha > \alpha_c$, the system generates infinite period of laminar phase and the two chaotic systems are in synchronization with each other. The eq. (9) converge easily to zero in accordance with the value $\beta$ by which multiplies the difference of the two variables. Accordingly, this method has the same synchronizing condition as the method of feedbacking the variable of the master chaotic system to the slave system.

Comparing the synchronizing method of the present invention with the synchronizing method of Pecora-Carrol synchronization, it is easily understood what the features of the present invention is. That is, although Pecora-Carrol synchronization occurs when sub-Lyapunov exponents are always negative, the synchronization according to the present invention occurs at the critical value condition that the system including the variable differences of two chaotic systems generates infinite period of laminar phase which is connected with on-off intermittency. Pecora-Carrol synchronization phenomenon is different from the synchronization phenomenon due to the critical value condition of on-off intermittency.

Examining the synchronization phenomena in consideration of the difference equation, a master difference equation and a slave difference equation may be defined as following equations, respectively.

$$x_{n+1} = 4ax_n(1-x_n) + by_n(1-x_n)(\mathrm{mod}1) \quad (10)$$
$$y_{n+1} = 4ay_n(1-y_n) + bx_n(1-y_n)(\overline{\mathrm{mod}1})$$

$$x'_{n+1} = 4ax'_n(1-x'_n) + by'_n(1-x'_n)(\mathrm{mod}1) \quad (11)$$
$$y'_{n+1} = 4ay'_n(1-y'_n) + bx'_n(1-y'_n(\overline{\mathrm{mod}1}))$$

where a=0.89 and b=0.9

If the synchronizing equations are substituted into the eqs. (10) and (11) as in the logistic map, the master chaotic system and the slave chaotic system can be expressed as following equations (12) and (13), respectively.

$$X_{n+1}=4\alpha(X_n+f_n)(1-(X_n+f_n))+b(Y_n+g_n)(1-(X_n+f_n))(\mathrm{mod}1)$$
$$Y_{n+1}=4\alpha(Y_n+g_n)(1-(Y_n+g_n))+b(x_n+f_n)(1-(Y_n+g_n))(\mathrm{mod}1) \quad (12)$$

where $\zeta_n$ is a noise signal with values $0<\zeta_n<1$, $f_n=0.4(\zeta_n-x_n)$, $g_n=0.4(\zeta_n-y_n)$.

$$x'_{n+1} = \qquad (13)$$
$$4a(x'_n + f'_n)(1 - (x'_n + f'_n)) + b(y'_n + g'_n)(1 - (x'_n + f'_n))(\text{mod}1)$$
$$y'_{n+1} = 4a(y'_n + g'_n)(1 - (y'_n + g'_n)) +$$
$$b(x'_n + f'_n)(1 - (y'_n + g'_n))\overline{(mod1)}$$

where ζn is a noise signal with values 0<ζn<1, fn=0.4(ζn−x'n), gn=0.4(ζn−y'n).

And, mod1 takes the only values under a decimal point when mod1>1 and mod1 has the values that the positive numbers are added to the negative values of mod1 when mod1<0 to have the values 0<mod1<1 in eq. (10) to eq. (13).

FIG. 10A to FIG. 10C are wave form charts of the state variables of the master and slave systems and the difference therebetween when the master system and the slave system are not in synchronization with each other. FIG. 10A shows a wave form chart of the variable $y_n$ of the master system and FIG. 10C shows a wave form chart of the variable $y'_n$ of the slave system and FIG. 10B shows the difference between the state variables $y_n$ and $y'_n$. As shown in FIG. 10B, the variable $y_n$ of the master system and the variable $y'_n$ of the slave system have different values as time evolves.

Figures 11A, 11B, 11C:
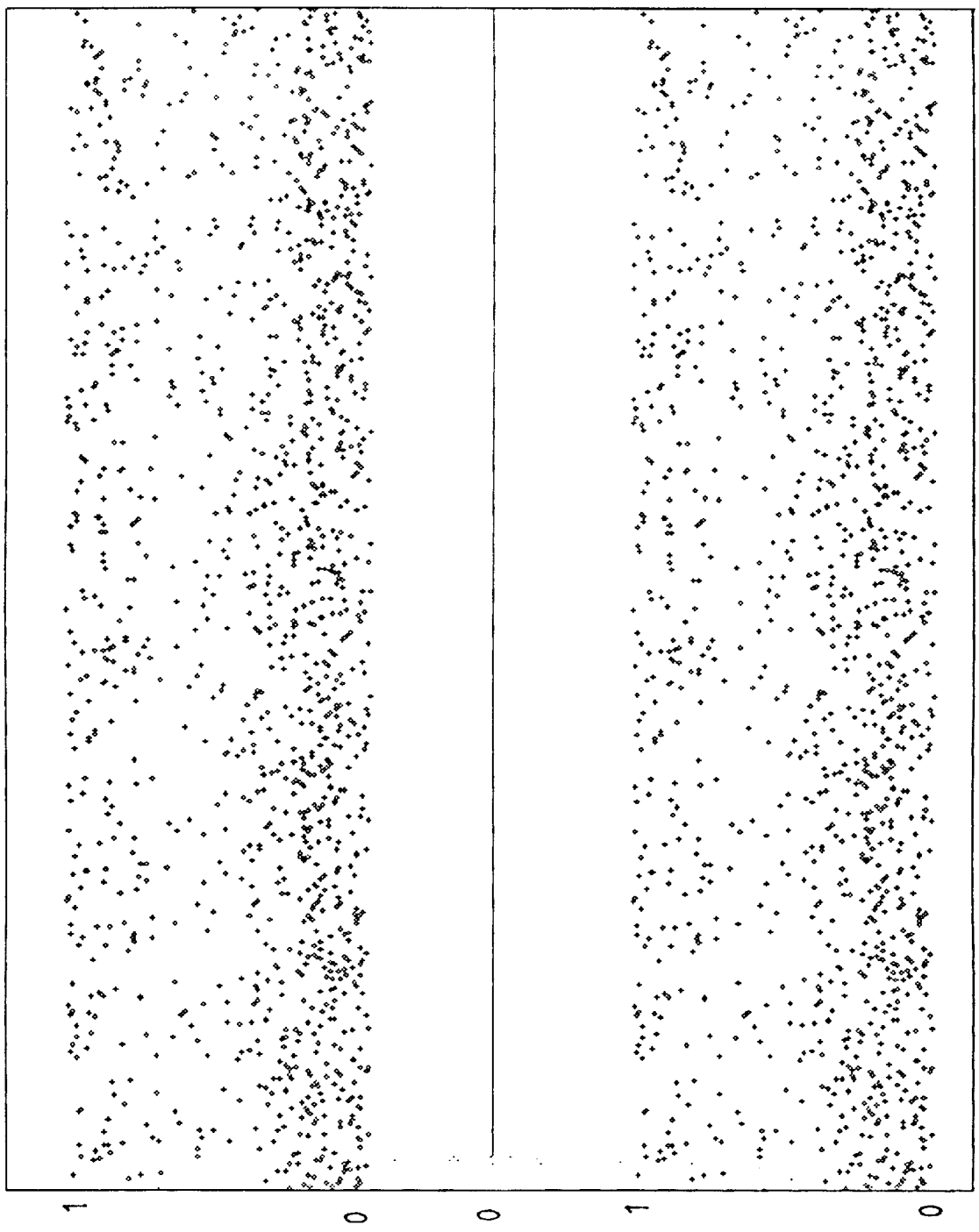
FIG. 11A to FIG. 11C are wave form charts of the state variables of the master part and slave part and the difference therebetween when the master part and slave part are in synchronization with each other in the coupled map.

FIG. 11A to FIG. 11C are wave form charts of the state variables of the master and slave systems and the difference therebetween when the master system and the slave system are in synchronization with each other. FIG. 11A shows a wave form chart of the variable $y_n$ of the master system and FIG. 10C shows a wave form chart of the variable $y'_n$ of the slave system and FIG. B shows the difference between the state variables $y_n$ and $y'_n$ which are enlarged by ten times. As shown in FIG. 11B, the variable $y_n$ of the master system and the variable $y'_n$ of the slave system have identical values as time evolves when the master system and the slave system are in synchronization with each other. That is, assessing the trajectories of the variables $y_n$ and $y'_n$, two chaotic systems have different trajectories at the initial stage since two parts have different initial conditions. Then, the synchronization begins. Finally, the state variables $y_n$ of the master system coincides with the state variable $y'_n$ of the slave system and the two systems have identical trajectories as a certain time evolves.

From now on, chaotic attractors of two chaotic systems in a phase space of $x_n$-$y_n$ plane are examined to see how much the difference between the chaotic signals after and before the synchronization exists.

Figure 12A:
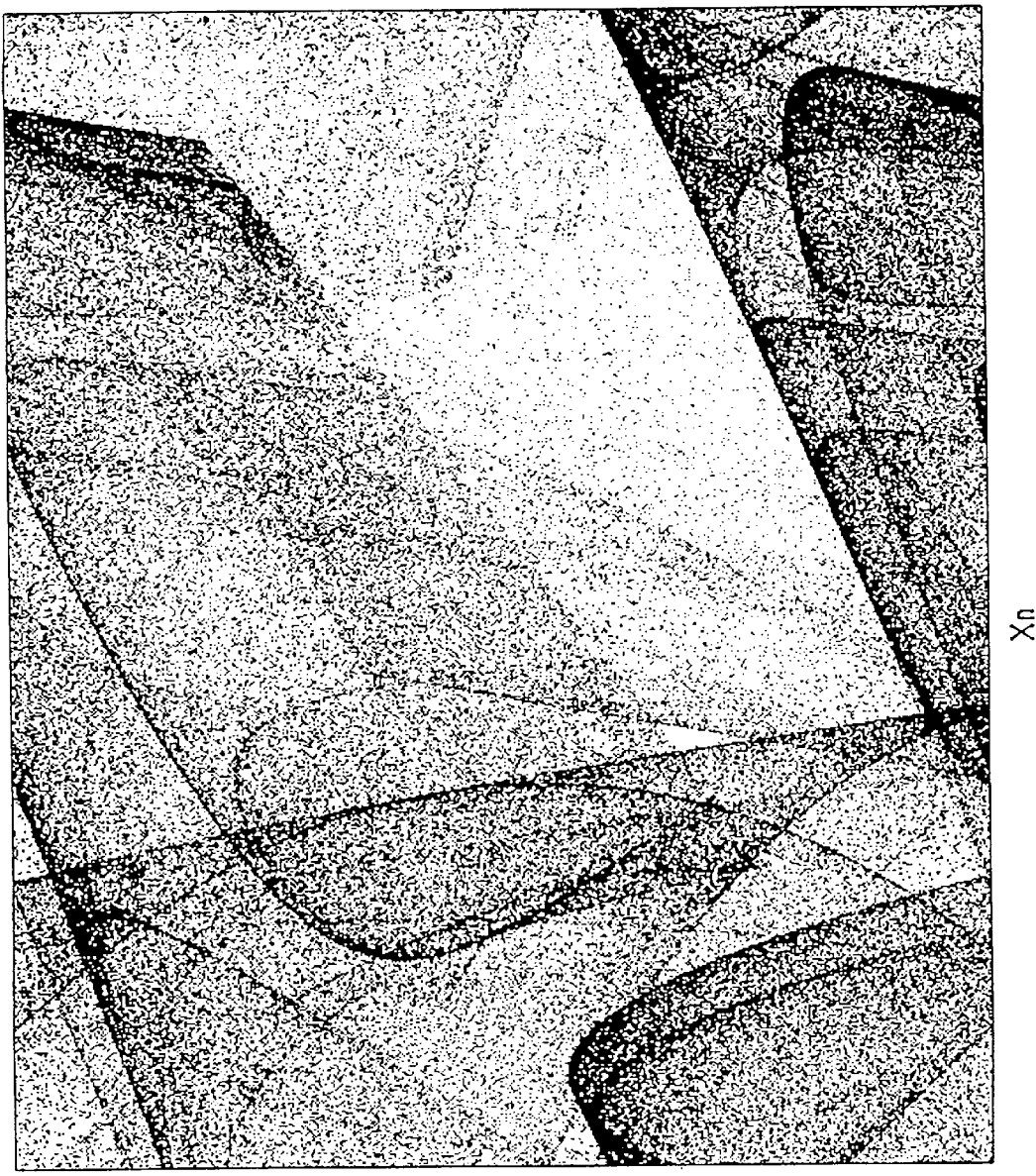
FIG. 12 and FIG. 12B show shapes of chaotic attractors in x-y phase space before and after the synchronization in the coupled map.
Figure 12B:

Referring to FIG. 12A and FIG. 12B, FIG. 12A and FIG. 12B show shapes of chaotic attractors in $x_n$-$y_n$ phase space before and after the synchronization. FIG. 12A illustrates a normal attractor of the coupled map before the synchronization. However, FIG. 12B illustrates an attractor after the synchronization analogous to a very complex noise which has not a fractal shape of the general chaotic attractor and the original shape of the normal attractor cannot be discovered in the changed attractor of FIG. 12B since the actual chaotic systems are irreversible.

Hereinafter, as an application of the synchronized chaotic system according to the present invention, the linking of the two remote parts for secure communication will be explained in detail.

The communication system according to the present invention uses at least an arbitrary variable of the master part as a masked signal wherein the message signal as an aural signals is combined with the arbitrary variable. The transmitter transmits the aural signal which is smaller than power spectrum of the chaotic signal of the master part, The receiver uses a noise signal or a chaotic signal as a synchronizing signal and reconstructs the original aural signal by removing the synchronized variable of the slave part corresponding to the transmitted variable of the master part from the received chaotic signal or the masked signal to detect the message signal of the aural signal. At this time, undesired listeners will not detect the information being transmitted and will detect only what appears to be the noise or chaotic signal. Really, since the chaotic signals generating from the chaotic parts are very disorderly, anyone has not the least idea of the equations for governing the chaotic master and slave parts. Accordingly, the communication system according to the present invention has the advantage of highly reliable secret security since the chaotic signals cannot be detected by various chaos anticipation methods.

Figure 13:
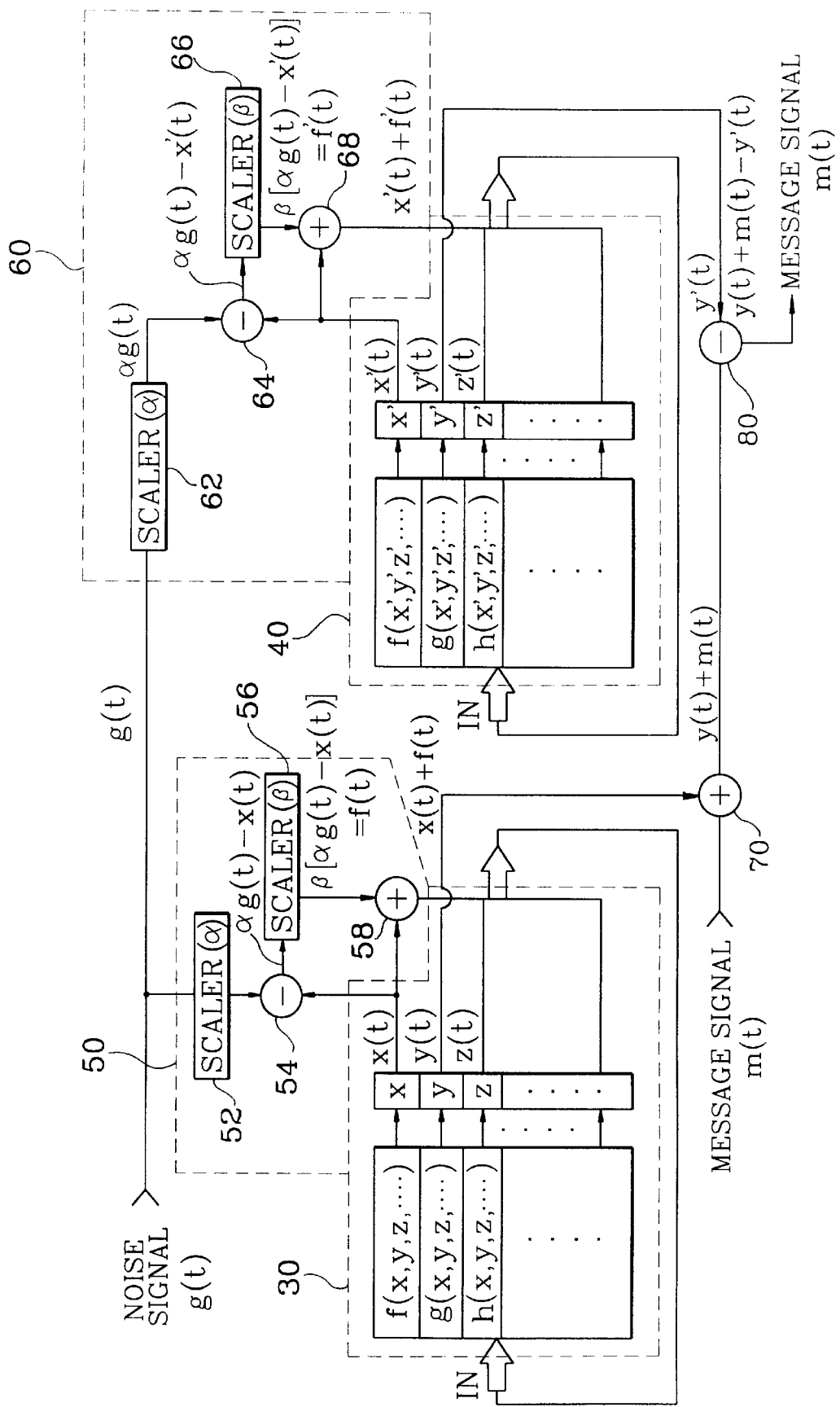
FIG. 13 is an operational diagram explaining secret communication concept using the synchronized chaotic system according to the present invention.

Referring to FIG. 13, a communication system according to the present invention comprises the master part, the slave part, the first synchronizing part, and the second synchronizing part as shown in FIG. 3 and further comprises an adder 20 as an encoding part and a subtracter 0 as a decoding part.

The adder 70 adds a message signal m(t) to an arbitrary variable, for example, y(t) of the master part 30 and transmits the mixed signal y(t)+m(t). The subtracter 80 subtracts the variable y'(t) of the slave signal 40 corresponding to the variable y(t) of the master part 30 from the mixed signal y(t)+m(t) to reconstruct the message signal m(t)=y(t)+m(t)−y'(t).

Figure 14A:
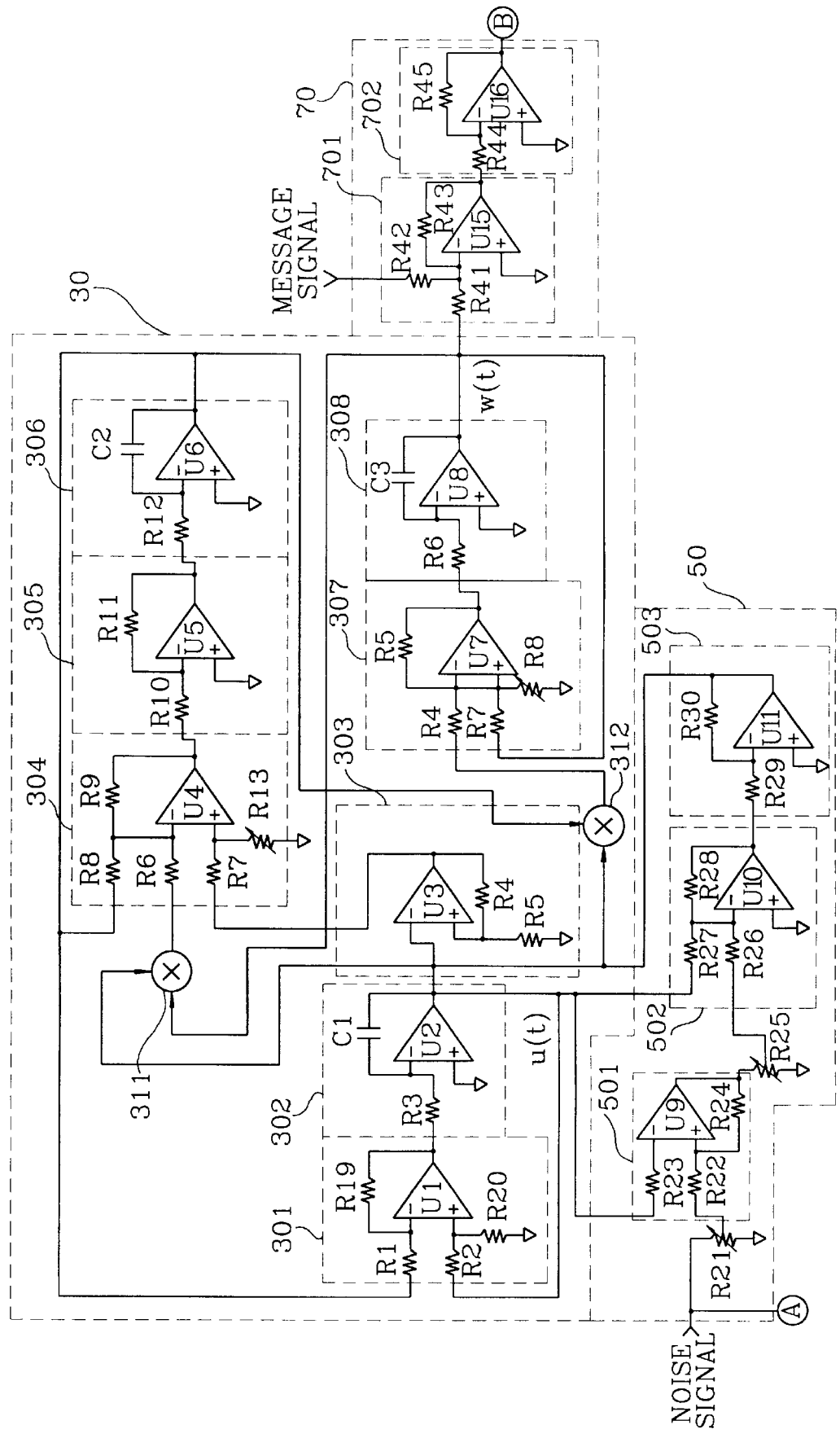
FIG. 14A and FIG. 14B are circuit diagrams illustrating an embodiment of a secret communication system according to the present invention.

Referring to FIG. 14A, the constitutions of the master part 30 and the first synchronizing part 50 are identical to those of FIG. 5A. Therefore, the detailed descriptions thereof are omitted in here. The adder 70 comprises a fifteenth operational amplifier 701 having an operational amplifier U15 and a peripheral circuit to add the message signal m(t) to the output signal w(t) of the eighth amplifier 308 of the master 30 and then invert the mixed signal, and a sixteenth operational amplifier 702 having an operational amplifier U16 and a peripheral circuit to invert the output signal of the fifteenth operational amplifier 701.

Figure 14B:
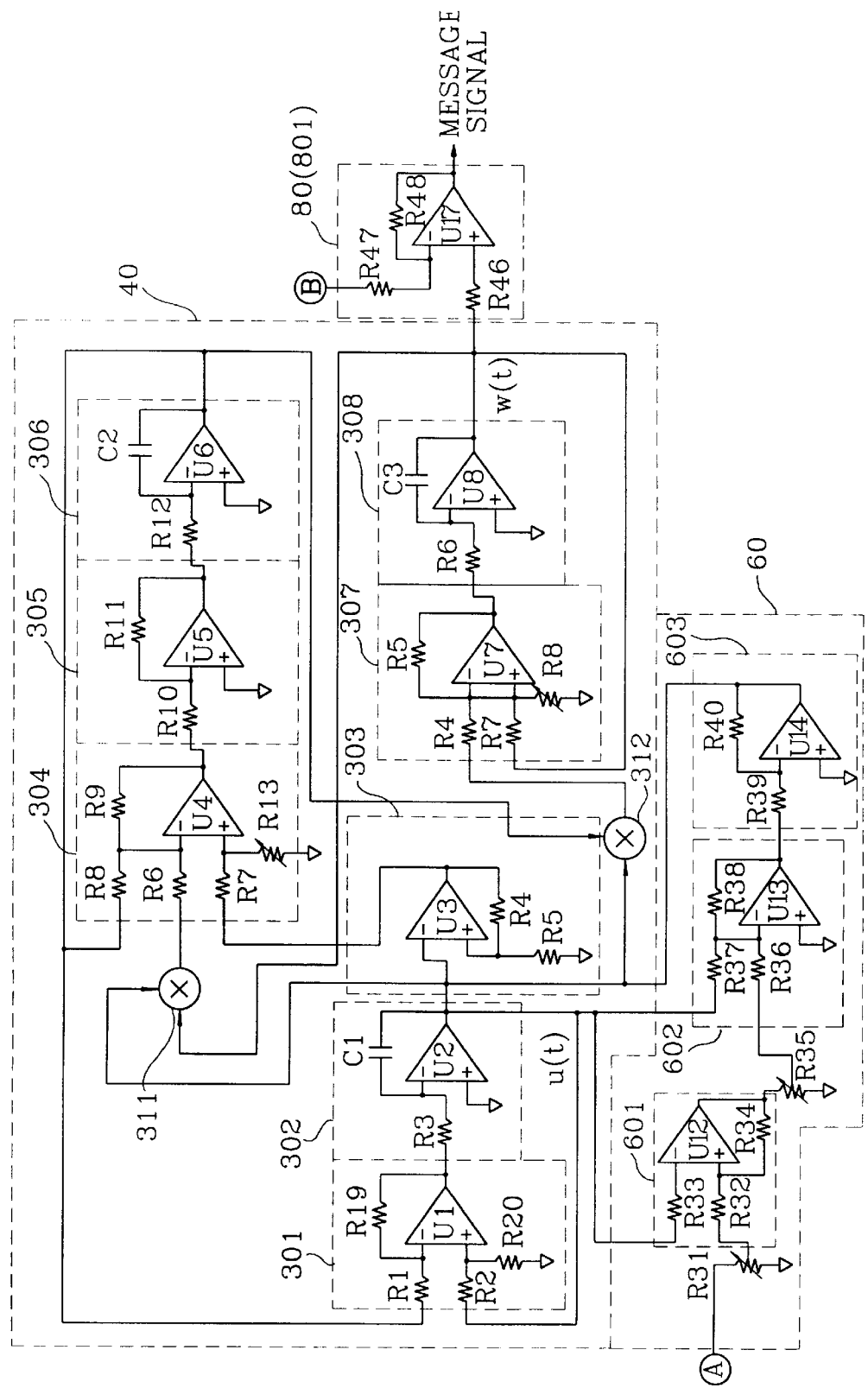

Referring to FIG. 14B, the constitutions of the slave part 40 and the second synchronizing part 60 are identical to those of FIG. 5B. Therefore, the detailed descriptions thereof are omitted in here. The subtracter 80 comprises a seventeenth operational amplifier 801 having an operational amplifier U17 and a peripheral circuit to subtract the output signal of the eighth operational amplifier 408 of the slave part 40 from the mixed output signal of the sixteenth operational amplifier 702.

From now on, the operation of the communication system according to the present invention is explained.

First of all, the master part 30 and the slave part 40 is in synchronization with each other by the first and second synchronizing parts 50 and 60 using the noise signal or chaotic signal g(t). Then, The transmitter transmits the masked signal y(t)+m(t) where y(t) is the variable of the master part 30 and m(t) is the message signal of the aural signal which is very smaller than power spectrum of the chaotic signal of the master part 30. Thereafter, the receiver with the slave part 40 reconstructs the original message signal m(t) by subtracting the variable y'(t) of the slave part 40 from the masked signal m(t)+y(t).

Figures 15A, 15B, 15C, 15D:
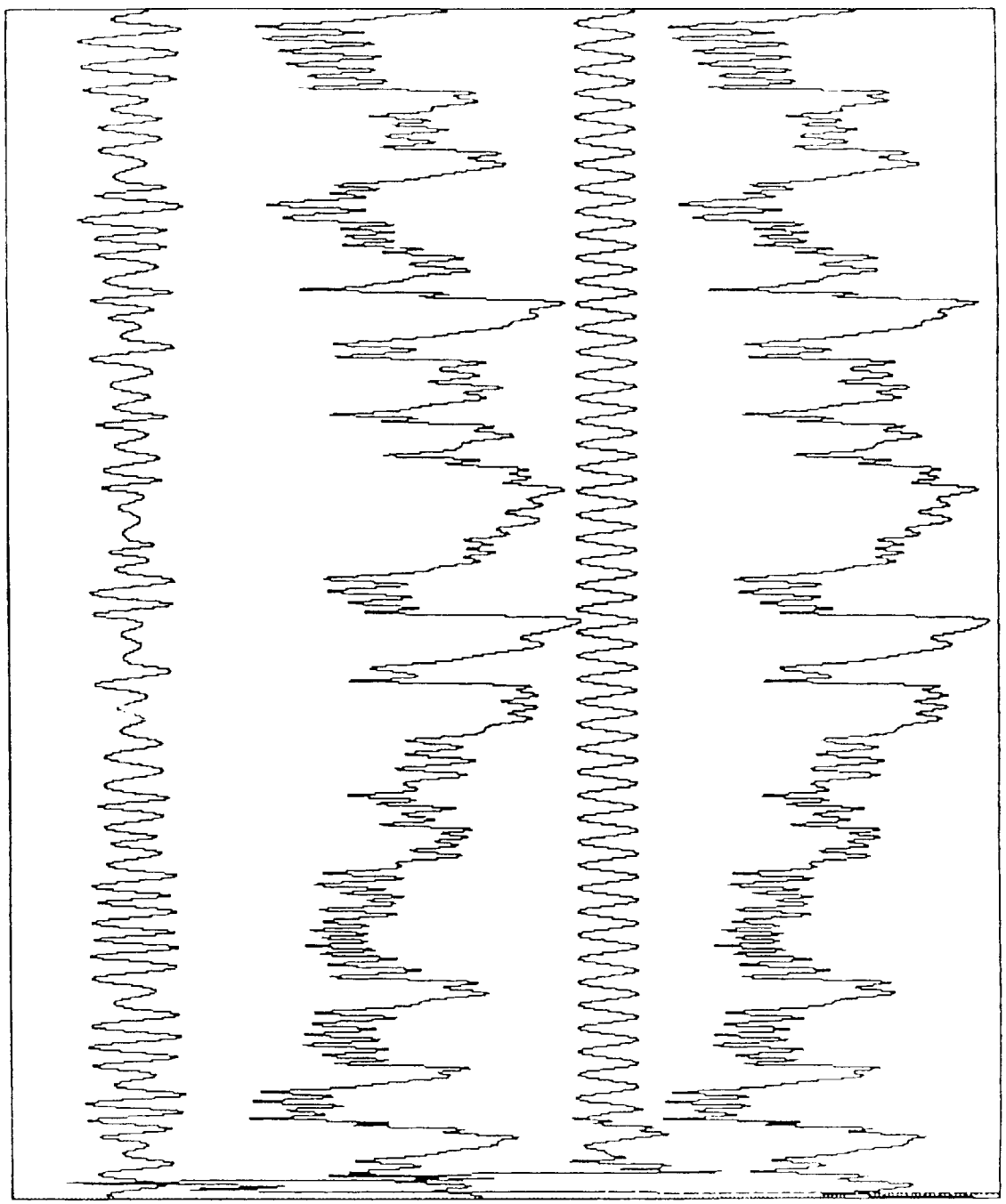
FIG. 15A to FIG. 15D are wave form charts of the secret communication system in accordance to the result that the master part and the slave part are synchronized each other.

Referring to FIG. 15A to FIG. 15D, FIG. 15A shows a wave form of the noise signal g(t) for synchronization FIG. 15B shows a wave form of the mixed signal or the masked signal y(t)+m(t) and FIG. 15C shows a wave form of the retrieved message signal m(t) with a sign wave, and FIG. 15D shows a wave form of the synchronized variable y'(t) of the slave part. Here, comparing the wave form of FIG. 15C with the wave form of FIG. 7C, while the difference y(t)-y'(t) between the variables of the master and slave parts becomes zero as shown in FIG. 7C after the synchronization by the synchronizing system wherein the message signal m(t) is not combined with the variable of the master part, the difference between the received masked signal y(t)+m(t) and the regenerated variable y'(t) becomes the message signal m(t) as shown in FIG. 15C, in the communication system using the synchronization system wherein the message signal m(t) is combined with the variable y(t).

For encryption communication, the power spectrum of the message signal have to be hidden in the power spectrum of the chaotic signal so that the message signal may not be discriminated from the masked signal. Really, since the magnitude of the message signal is very small, the wave form of the masked signal shown in FIG. 15B cannot be discriminated from the wave form of the variable of the slave part shown in FIG. 15D according to the present. The message signal can be retrieved as shown in FIG. 15C by subtracting the received signal into the receiver shown in FIG. 15B from the signal shown in FIG. 15D. Accordingly, the present invention can be effectively applied to encryption communication systems by synchronizing the master part of the transmitter with the slave part of the receiver of the receiver by means of the first synchronizing part of the transmitter and the second synchronizing receiver and also the noise signal or the chaotic signal for synchronization.

On the other hand, the synchronizing system according to the present invention can be applied to the secret communication system using the difference equation. The difference equation can use the combined map as it stands. The secret communication system using the difference equation can employ analog or digital electronic circuits or computers. Since those ordinally skilled in the art will readily construct the circuits, further explanation is omitted and the only the encryption method using computers is shortly described hereafter.

When a master computer and a slave computer are carrying out an identical operation, the message signal is mixed with the chaotic signal of the master part of the master computer generated by random numbers or another chaotic signals and is transmitted to the slave computer. Then, the slave part of the slave computer synchronizes the chaotic signal thereof with the chaotic signal of the master part of the master computer by using the random numbers or another chaotic signals as synchronizing signals. Thereafter, the chaotic signal of the slave part is subtracted from the transmitted mixed signal to retrieve the message signal. At this time, when the random numbers or another chaotic signal and the mixed signal with the message signal and the chaotic signal are transmitted to the slave part of the slave computer, the conventional encryption techniques for secret communication enables the present invention to provide more excellent security. Also the key signals which are used as the random numbers or another signals maximize the security.

On the other hand, the present invention can be applicable not only to the Lorenz chaotic system which is described above as a preferred embodiment, but to all the chaotic systems given by differential equation forms. Also, the resent invention can be applicable not only to the difference equation which is described above an a preferred embodiment, but to all the chaotic systems given by difference equation forms.

The invention is in no way limited to the embodiments described hereinabove. Various modifications of disclosed embodiments as well as other embodiments of the invention will become apparent to persons skilled in the art upon reference to the description of the invention. It is therefore contemplate that the appended claims will cover any such modification or embodiments as fall within the true scope of the invention.

What is claimed is:

1. A synchronized chaotic system comprising:

a master part for generating first chaotic signal with chaotic characteristics, state variables of said master part being functionally interrelated;

a slave part identical to said master part for generating second chaotic signal with chaotic characteristics corresponding to the first chaotic signal, state variables of said slave part being functionally interrelated;

first synchronizing means for receiving at least one variable of said master part and an external signal with noise or chaotic characteristics and for modulating the at least one variable of said master part by the external signal with noise or chaotic characteristics and for feeding back the at least one variable of said master part modulated by the external signal with noise or chaotic signal to said master part; and second synchronizing means for receiving at least one variable of said slave part corresponding to the at least one variable of said master part and the external signal with noise or characteristics and for modulating the at least one variable of said slave part by the external signal with noise or chaotic characteristics and for feeding back the at least one variable of said slave part modulated by the external signal with noise or chaotic characteristics to said slave part.

2. A synchronized chaotic system as recited as claim 1, wherein said first synchronizing means comprises a first scaler for scaling the external signal by a first scaling factor, a subtracter for subtracting the at least one variable of said master part from the scaled external signal, a second scaler for scaling an output signal of the subtracter by a second scaling factor, and an adder for adding the at least one variable of said master part to an output signal of the second scaler and for feeding back an output signal of the adder to said master part.

3. A synchronized chaotic system as recited as claim 1, wherein said second synchronizing means comprises a first scaler for scaling the external signal by a first scaling factor, a subtracter for subtracting the at least one variable of said slave part from the scaled external signal, a second scaler for scaling an output signal of the subtracter by a second scaling factor, and an adder for adding the at least one variable of said slave part to an output signal of the second scaler and for feeding back an output signal of the adder to said slave part.

4. A synchronized chaotic system as recited as claim 1, wherein said master part is synchronized with said slave part if the output difference of said master part and said slave part illustrates infinite period of laminar phase connected with on-off intermittency.

5. A communication system using a synchronized chaotic system comprising:

a transmitter including a master part for producing first chaotic signal with chaotic characteristics, state variables of said master part being functionally interrelated, a first synchronizing means for receiving at least one variable of the master part and an external signal with noise or chaotic characteristics and for modulating the at least one variable of the master part by the external signal with noise or chaotic characteristics and for feeding back the at least one variable of the master part modulated by the external signal with noise or chaotic characteristic to the master part, and an adder for adding a message signal to the first chaotic signal of the master part to produce a masked signal; and a receiver including a slave part identical to the master part for reproducing second chaotic signal with chaotic characteristics corresponding to the first chaotic signal, state variables of said master part being functionally interrelated, a second synchronizing means for receiving at least one variable of the slave part corresponding to the at least one variable of the slave part and the external signal with noise or chaotic characteristics and for modulating the at least one variable of the slave part by the external signal and for feeding back the at least one variable of the slave part modulated by the external signal with noise or chaotic characteristics to the slave part, and a subtracter for removing the second chaotic signal of the slave part which is synchronized with the first chaotic signal of the master part from the masked signal of the adder to detect the message signal.

6. A communication system as recited as claim 5, wherein said first synchronizing means comprises a first scaler for scaling the external signal by a first scaling factor, a subtracter for subtracting the at least one variable of said master part from the scaled external signal, a second scaler for scaling an output signal of the subtracter by a second scaling factor, and an adder for adding the at least one variable of said master part to an output signal of the second scaler and for feeding back an output signal of the adder to said master part.

7. A communication system as recited as claim 5, wherein said second synchronizing means comprises a first scaler for scaling the external signal by a first scaling factor, a subtracter for subtracting the at least one variable of said slave part from the scaled external signal, a second scaler for scaling an output signal of the subtracter by a second scaling factor, and an adder for adding the at least one variable of said slave part to an output signal of the second scaler and for feeding back an output signal of the adder to said slave part.

8. A communication system as recited as claim 5, wherein said master part is synchronized with said slave part if the output difference of said master part and said slave part illustrates infinite period of laminar phase connected with on-off intermittency.

\* \* \* \* \*